United States Patent
Ishii et al.

(10) Patent No.: US 8,540,280 B2
(45) Date of Patent: Sep. 24, 2013

(54) STEERING APPARATUS

(75) Inventors: Toru Ishii, Gunma-ken (JP); Takahiro Tanaka, Gunma-ken (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 13/520,576

(22) PCT Filed: Mar. 15, 2012

(86) PCT No.: PCT/JP2012/056671
§ 371 (c)(1),
(2), (4) Date: Jul. 4, 2012

(87) PCT Pub. No.: WO2012/128171
PCT Pub. Date: Sep. 27, 2012

(65) Prior Publication Data
US 2012/0319388 A1    Dec. 20, 2012

(30) Foreign Application Priority Data

Mar. 18, 2011  (JP) .................................. 2011-061253
Mar. 18, 2011  (JP) .................................. 2011-061258

(51) Int. Cl.
*B62D 1/19*    (2006.01)
(52) U.S. Cl.
USPC ........................................................ 280/777
(58) Field of Classification Search
CPC ............ B62D 1/18; B62D 1/19; B62D 1/192; B62D 1/195
USPC .......... 74/492, 493; 188/371, 374; 280/775, 280/777; 248/548
See application file for complete search history.

(56) References Cited

U.S. PATENT DOCUMENTS

| | | | | |
|---|---|---|---|---|
| 4,022,495 A * | 5/1977 | Pizzocri | ...................... | 280/750 |
| 4,098,141 A * | 7/1978 | Yamaguchi | ...................... | 74/492 |
| 4,943,028 A * | 7/1990 | Hoffmann et al. | ............ | 248/548 |
| 5,082,311 A * | 1/1992 | Melotik | ........................ | 280/777 |
| 6,863,306 B2 * | 3/2005 | Bechtel et al. | ................ | 280/775 |
| 7,434,839 B2 * | 10/2008 | Tokioka | ........................ | 280/777 |

FOREIGN PATENT DOCUMENTS

| | | |
|---|---|---|
| JP | 59-66670 U | 5/1984 |
| JP | 10-129504 A | 5/1998 |

(Continued)

*Primary Examiner* — Joseph Rocca
(74) *Attorney, Agent, or Firm* — Miles & Stockbridge P.C.

(57) ABSTRACT

A steering apparatus has a column 46, a column 42 fitted to the column 46 and able to make collapsing movement or move, a bracket 21 attached to a vehicle body in such a way that it can be detached with the column 42 by an impact force of a secondary collision, a guide bracket 61 fixed to the column 46 and having a guide groove 63, and a pin 71 fixed to the bracket 21 and movable with the bracket 21 while being guided by the guide groove 63. The guide bracket 61 has a flat plate portion 61d that is not contact with the bracket 21. A guide groove 63 is provided in the flat plate portion 61d. The pin 71 has a head portion 713 at the top having a diameter larger than its shaft portion. The apparatus has a gap setting portion that is in abutment with the upper surface of the bracket 21 when the pin 71 is fixed to the bracket 21 to set the distance between the lower surface of the head portion 713 and the upper surface of the bracket 21 to a predetermined value. Thus, there is provided a steering apparatus in which the detaching force upon detachment of the column 42 in the forward direction with respect to the vehicle body by the impact force of a secondary collision can be adjusted accurately with an easy detaching force adjusting operation.

19 Claims, 23 Drawing Sheets

FOREIGN PATENT DOCUMENTS

| | | |
|---|---|---|
| JP | 2004-291691 A | 10/2004 |
| JP | 2005-162072 A | 6/2005 |
| JP | 2005-219641 A | 8/2005 |
| JP | 2007-69800 A | 3/2007 |
| JP | 2009-107506 A | 5/2009 |
| JP | 2010-23622 A | 2/2010 |

\* cited by examiner

STEERING APPARATUS

TECHNICAL FIELD

The present invention relates to a steering apparatus, in particular to a steering apparatus in which the steering wheel is adapted to make collapsing movement or move frontward with respect to the vehicle body to absorb the impact load upon a secondary collision.

BACKGROUND ART

Japanese Patent Application Laid-Open No. 2005-219641 discloses a steering apparatus in which the steering wheel is adapted to make collapsing movement or move frontward with respect to the vehicle body to absorb the impact load upon a secondary collision. In the steering apparatus disclosed in Japanese Patent Application Laid-Open No. 2005-219641, a lower column and an upper column are fixedly attached to the vehicle body by a vehicle-mounting bracket. A certain impact force upon a secondary collision causes the upper column to be detached from the vehicle-mounting bracket and to make collapsing movement or move frontward with respect to the vehicle body.

PRIOR ART DOCUMENT

Patent Document

Patent Document 1: Japanese Patent Application Laid-Open No. 2005-219641

SUMMARY OF THE INVENTION

Problem to be Solved by the Invention

In the steering apparatus disclosed in Japanese Patent Application Laid-Open No. 2005-219641, a tilt bracket of the upper column is fastened to the vehicle-mounting bracket with a coated plate having a low friction coefficient provided therebetween to allow smooth detachment of the upper column and the tilt bracket from the vehicle-mounting bracket by a certain impact force upon a secondary collision. However, since the coated plate is fastened to the vehicle-mounting bracket by bolts, the magnitude of the force that causes the detachment of the upper column and the tilt bracket varies depending on the fastening torque of the bolts. Therefore, it is necessary to adjust the fastening torque of the bolts to a predetermined value. This leads to problems such as an increase in the assembly time and a need for skill in the assembly of the coated plate.

Means for Solving the Problem

An object of the present invention is to provide a steering apparatus that allows accurate adjustment, by easy adjusting operation, of the magnitude of the force that causes the detachment of the upper column in the forward direction in the vehicle body by the impact force upon a secondary collision.

The above-object is achieved by the following means. Specifically, the present invention provides a steering apparatus comprising a lower column that can be fixed to a vehicle body by its front side with respect to the vehicle body, an upper column that is fitted to the aforementioned lower column in such a way as to be able to make collapsing movement or move frontward with respect to the vehicle body and rotatably supports a steering shaft on which a steering wheel is attached, an upper bracket that can be attached to the vehicle body in such a way that it can be detached forward with respect to the vehicle body together with the aforementioned upper column by an impact force upon a secondary collision, a guide bracket that is fixed to the aforementioned lower column by its front side with respect to the vehicle body, extends rearward with respect to the vehicle body along the aforementioned lower column, and has a guide groove that guides the collapsing movement of the aforementioned upper column upon a secondary collision, and a guide pin that is fixed to the aforementioned upper bracket and can move with the upper bracket with the outer circumferential surface of its shaft portion being guided by the aforementioned guide groove, wherein the aforementioned guide bracket has a flat plate portion that is not in contact with the aforementioned upper bracket, the aforementioned flat plate portion being provided with the aforementioned guide groove, the aforementioned guide pin has a head portion provided on top of the shaft portion of the guide pin and having a diameter larger than the shaft portion, and the steering apparatus comprises a gap setting portion that is in abutment with an upper surface of the aforementioned upper bracket when the aforementioned guide pin is fixed to the aforementioned upper bracket to set the length of a gap between a lower surface of the aforementioned head portion and an upper surface of the upper bracket to a predetermined value.

According to a preferred mode of the present invention, there is provided a steering apparatus comprising a spacer made of a synthetic resin that is externally fitted on an outer circumferential surface of the shaft portion of the guide pin and can make collapsing movement or move with its outer circumferential surface being in contact with the aforementioned guide groove, wherein the outer circumferential surface of the aforementioned spacer is provided on a cylinder portion that can make collapsing movement or move while being in contact with the aforementioned guide groove.

According to a preferred mode of the present invention, there is provided a steering apparatus in which the circumferential surface of the aforementioned spacer is provided with two flat portions parallel to each other that can make collapsing movement or move while being in contact with the aforementioned guide groove.

According to a preferred mode of the present invention, there is provided a steering apparatus comprising a flange portion provided at the top of the aforementioned spacer and having a diameter larger than the outer circumference of the spacer.

According to a preferred mode of the present invention, there is provided a steering apparatus in which the flange portion of the aforementioned spacer has a disk-like shape.

According to a preferred mode of the present invention, there is provided a steering apparatus in which the flange portion of the aforementioned spacer has a rectangular shape.

According to a preferred mode of the present invention, there is provided a steering apparatus comprising a projection that is provided on an upper surface of the aforementioned flange portion in such a way as to project upward with respect to the vehicle body and can be plastically deformed when pressed by a lower surface of the aforementioned head portion.

According to a preferred mode of the present invention, there is provided a steering apparatus in which the cross sectional area of the aforementioned projection of the aforementioned flange portion on a plane perpendicular to a center axis of the aforementioned spacer decreases upward with respect to the vehicle body.

According to a preferred mode of the present invention, there is provided a steering apparatus in which the groove width of the aforementioned guide groove at its front side with respect to the vehicle body is larger than the groove width of the guide groove at its rear end with respect to the vehicle body.

According to a preferred mode of the present invention, there is provided a steering apparatus in which a circumferential edge of the aforementioned guide groove of the aforementioned guide bracket is raised by burring.

According to a preferred mode of the present invention, there is provided a steering apparatus in which the aforementioned gap setting portion is a shoulder surface that is integral with the shaft portion of the aforementioned guide pin, and the distance between the lower surface of the aforementioned head portion and the aforementioned shoulder surface along the center axis of the aforementioned guide pin is larger than the length of the aforementioned spacer along the center axis.

According to a preferred mode of the present invention, there is provided a steering apparatus in which the aforementioned gap setting portion comprises a hollow cylindrical sleeve that is externally fitted on an outer circumferential surface of the shaft portion of the aforementioned guide pin and has an outer circumferential surface on which the aforementioned spacer is externally fitted, and the length of the aforementioned sleeve along its center axis is larger than the length of the aforementioned spacer along its center axis.

The steering apparatus according to the present invention comprises the guide groove parallel to the direction of collapsing movement provided on the guide bracket, the guide pin that is fixed to the upper bracket and can move with the upper bracket to the front end (with respect to the vehicle body) of the collapsing movement range with the outer circumferential surface of its shaft portion being guided by the guide groove, the head portion that is provided on top of the shaft portion of the guide pin and having a diameter larger than the shaft portion and in abutment with the upper surface of the guide bracket to restrict backlash of the upper bracket with respect to the direction perpendicular to the direction of collapsing movement, and the gap setting portion that is in abutment with an upper surface of the upper bracket when the guide pin is fixed to the upper bracket to set the length of a gap between a lower surface of the head portion and an upper surface of the upper bracket to a predetermined value.

Thus, backlash of the upper bracket relative to the guide bracket with respect to the direction perpendicular to the direction of collapsing movement is restricted by the gap setting portion, and the load that causes the upper bracket to be detached from the guide bracket can be set small and constant.

The apparatus also has the spacer made of a synthetic resin that is externally fitted on the outer circumferential surface of the shaft portion of the guide pin and can make collapsing movement or move with its outer circumferential surface being in contact with the guide groove, the flange portion provided at the top of the spacer and having a diameter larger than the outer circumference of the spacer, and the projection that is provided on the upper surface of the aforementioned flange portion in such a way as to project upward with respect to the vehicle body and can be plastically deformed when pressed by the lower surface of the aforementioned head portion.

Therefore, mere fixing of the guide pin to the upper bracket causes the head portion of the guide pin to press the projection by its lower surface to plastically deform or crush the projection. This provides a restriction of backlash of the upper bracket in the direction perpendicular to the direction of col-lapsing movement. Therefore, the operation of adjusting the backlash can be eliminated, assembly can be carried out without skill, and assembly time will be shortened.

Furthermore, the spacer is made of a synthetic resin, the friction coefficient between the guide groove and the guide pin can be made small. Therefore, the performance in absorbing the impact energy upon a secondary collision can be made stable, and the impact load absorption characteristics can be set accurately.

BRIEF DESCRIPTION OF THE DRAWINGS

FIG. 8A is a perspective view as seen from the upper surface side of a flange portion, and FIG. 8B is a perspective view as seen from below in FIG. 8A.

FIG. 9A is a perspective view as seen from the upper surface side of a flange portion, and FIG. 9B is a perspective view as seen from below in FIG. 9A.

MODES FOR CARRYING OUT THE INVENTION

In the following a first embodiment of the present invention and first to eighth modifications thereof will be described with reference to the drawings.

First Embodiment

Figure 1:
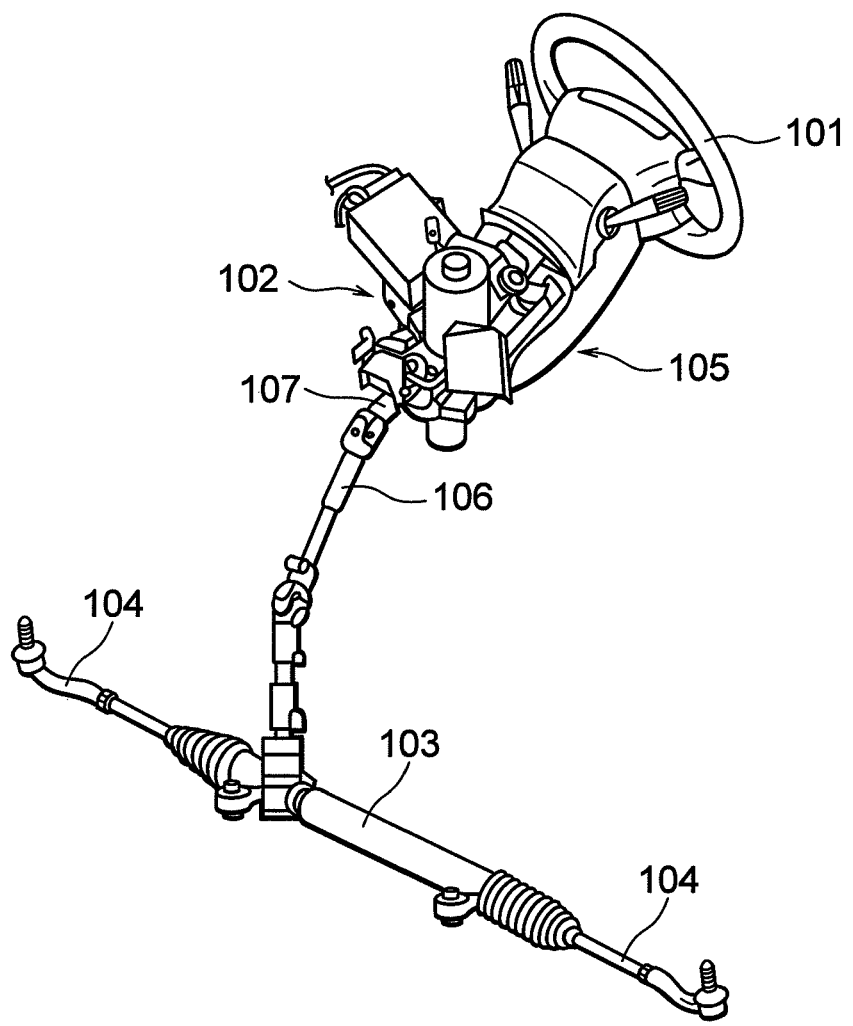
FIG. 1 is an overall perspective view of a steering apparatus to which a first embodiment or a second embodiment of the present invention is applied.

FIG. 1 is an overall perspective view of a steering apparatus to which a first or second embodiment of the present invention. As shown in FIG. 1, the steering apparatus according to the first and second embodiments of the present invention is an column-assist type power steering apparatus. In order to lighten the hand effort in operating the steering wheel 101, the column-assist, rack-pinion type power steering apparatus shown in FIG. 1 is adapted to apply a steering assisting force generated by the electric assist mechanism 102 attached to the column assembly 105 onto the output shaft 107 to move the rack of the rack-pinion type steering gear assembly 103 in two opposite directions, thereby steering the steer wheels via the tie rods 104.

Figure 2:
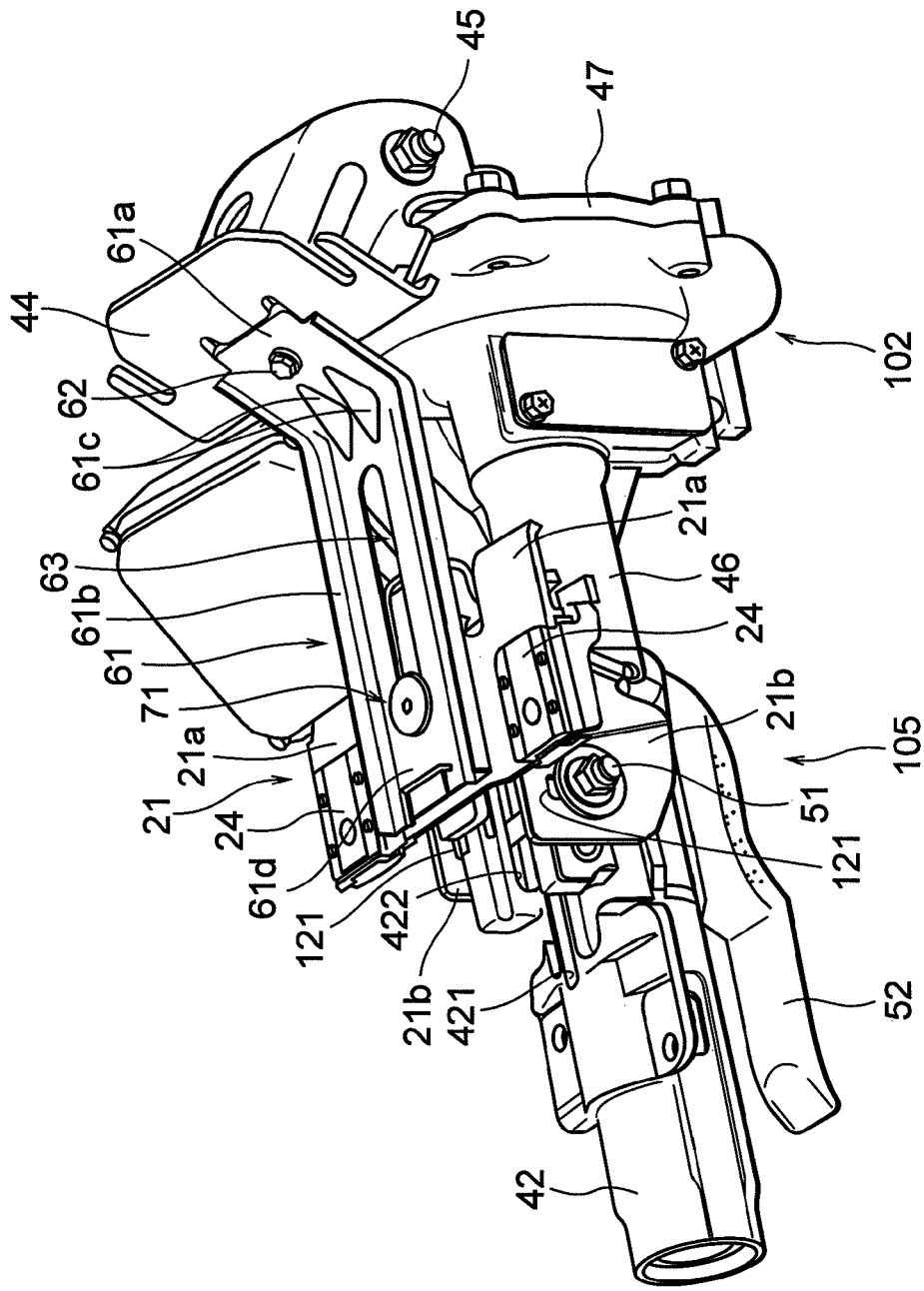
FIG. 2 is a perspective view of the relevant portions of the steering apparatus according to the first embodiment of the present invention, seen from above right from the rear of the vehicle body.
Figure 3:
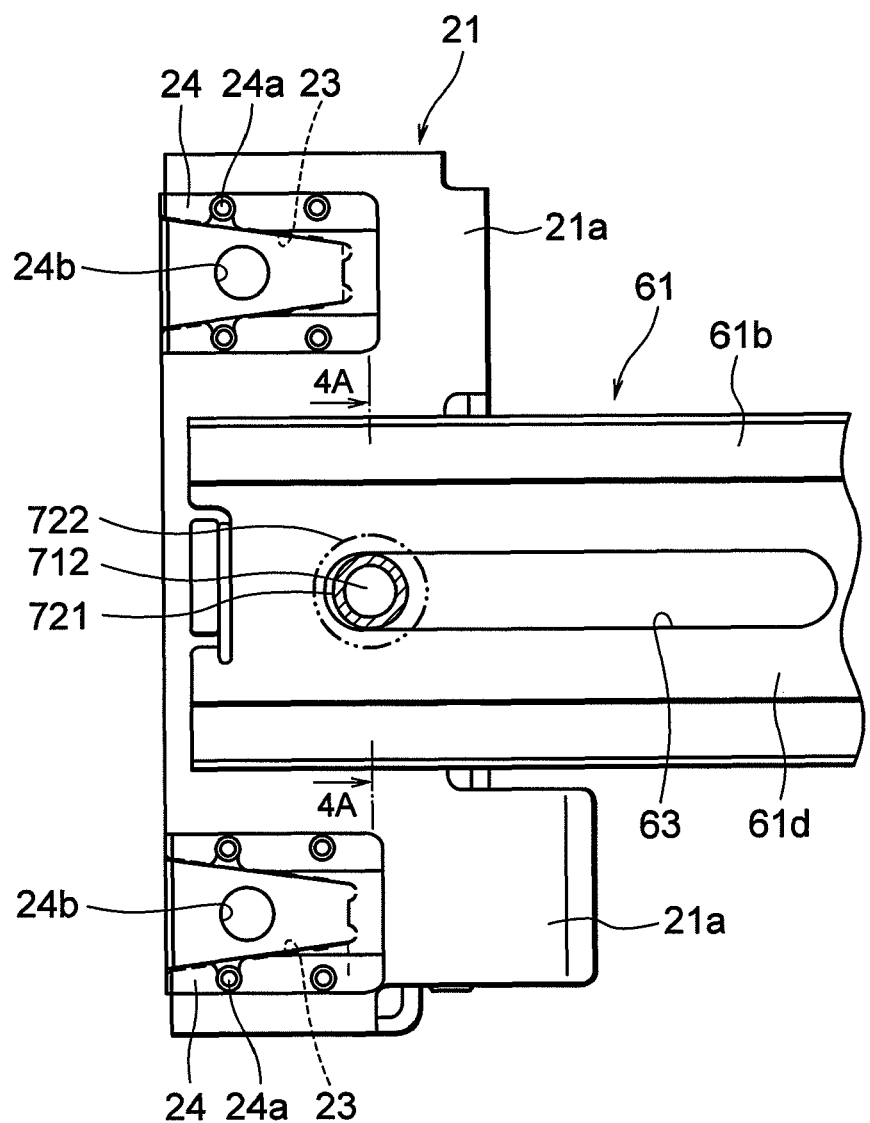
FIG. 3 is a top view of a guide bracket in FIG. 2, showing its rear (with respect to the vehicle body) portion.
Figure 4A:
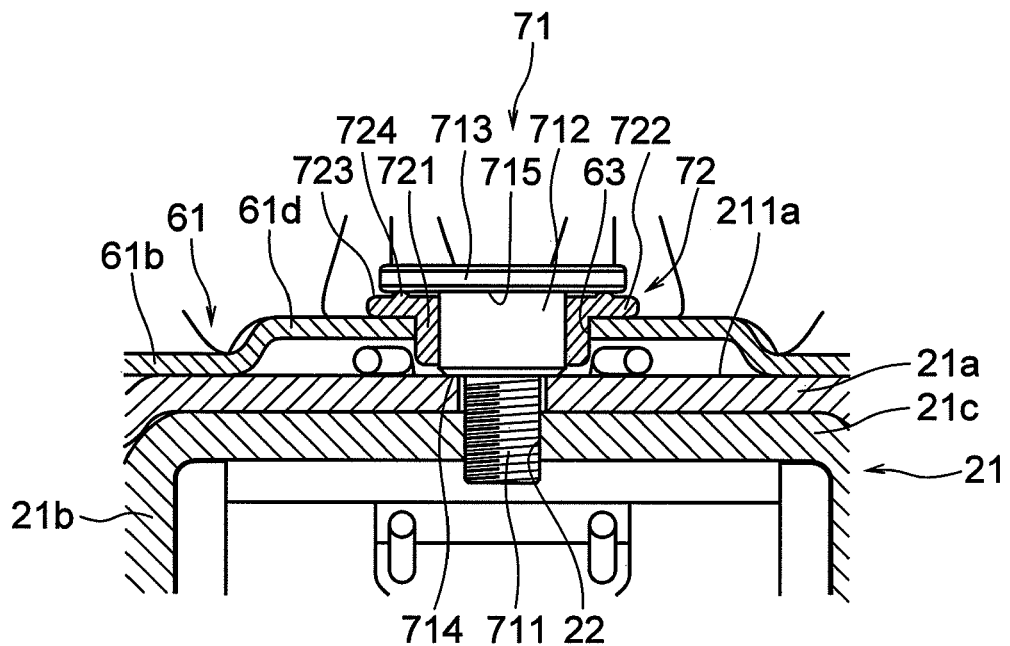
FIG. 4A is a cross sectional view taken along line 4A-4A in FIG. 3, showing the portion in which a resin spacer and the guide groove are in contact.
Figure 4B:
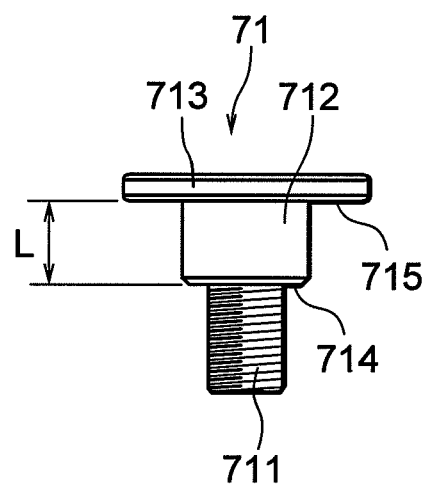
FIG. 4B is a front view showing a guide pin shown in FIG. 4A alone.
Figure 5:
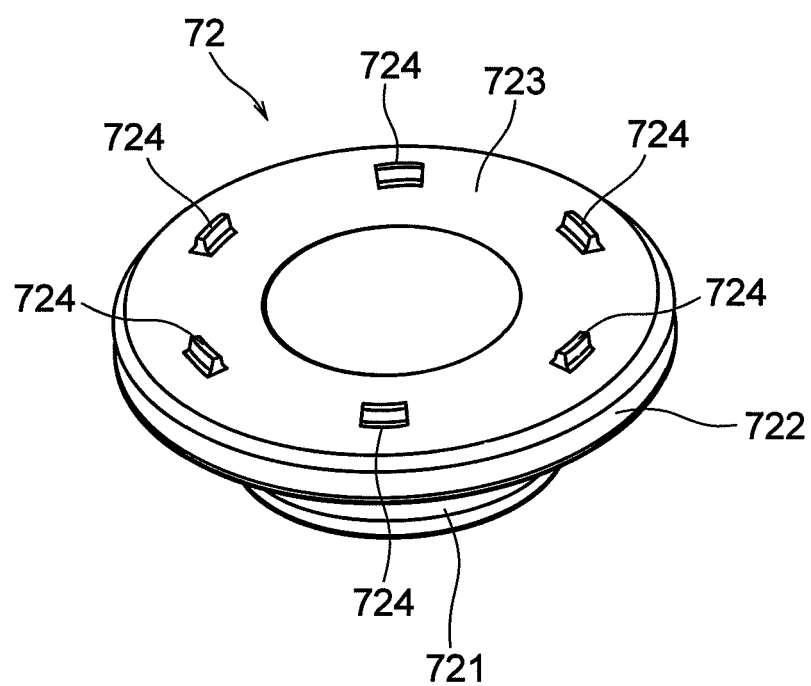
FIG. 5 is a perspective view of the resin spacer used in the first embodiment of the present invention.

FIG. 2 is a perspective view of the relevant portions of the steering apparatus according to the first embodiment of the present invention seen from above right from the rear of the vehicle body. FIG. 3 is a top view of a guide bracket in FIG. 2, showing its rear (with respect to the vehicle body) portion. FIG. 4A is a cross sectional view taken along line 4A-4A in FIG. 3 showing the portion in which a resin spacer and the guide groove are in contact. FIG. 4B is a front view showing a guide pin shown in FIG. 4A alone. FIG. 5 is a perspective view of the resin spacer used in the first embodiment of the present invention.

As shown in FIGS. 2 to 5, the column assembly 105 is composed of an upper column 42, which is the outer column, and a lower column 46, which is the inner column disposed on the front side (with respect to the vehicle body) of the upper column 42. A steering shaft (not shown) on which the steering wheel 101 shown in FIG. 1 is attached is rotatably supported on the rear side (with respect to the vehicle body) of the cylindrical upper column 42. The upper column 42 is guided by long grooves 121, 121 for tilt adjustment provided on side plates 21b, 21b of an upper bracket 21, which constitutes an upper vehicle-mounting bracket, to allow tilt adjustment.

The lower column 46 is internally fitted into the upper column 42 from the front with respect to the vehicle body (from right in FIG. 2) in such a way as to be able to move in a telescopic manner in the direction along its axis. A gear housing 47 of the electric assist mechanism 102 is attached to the front end (with respect to the vehicle body) of the lower column 46. A lower bracket 44, which constitutes a lower vehicle-mounting bracket, is attached on the upper (with respect to the vehicle body) portion of the gear housing 47. The lower bracket 44 is fixedly attached to the vehicle body (not shown) and supported in such a way that it can swing about a tilt center shaft 45 to allow tilt adjustment.

The upper column 42 has a slit 421 provided on its upper portion. The slit 421 penetrates the upper column 42 to its inner surface. The upper column 42 integrally has a member on which long grooves 422, 422 for telescopic adjustment having a longitudinal axis extending in parallel with the center axis of the upper column 42 are provided.

A fastening rod 51 passes through long grooves for tilt adjustment 121, 121 and the long grooves for telescopic adjustment 422, 422. An operation lever 52 is attached to an end of the fastening rod 51. The operation lever 52 is used to operate a movable cam and a fixed cam (not shown), which constitute a cam lock mechanism.

The upper column 42 is fastened (or clamped) on its sides by the side plates 21b, 21b of the upper bracket 21 by swinging the operation lever 52. With such fastening/loosening operation, the upper column 42 is clamped to/unclamped from the upper bracket 21. The adjustment of the tilt position of the upper column 42 is performed in the unclamped state. The fastening operation causes the diameter of the upper column 42 to decrease, thereby causing the inner circumferential surface of the upper column 42 to clamp the outer circumferential surface of the lower column 46/the loosening operation unclamps the outer circumferential surface of the lower column 46. The adjustment of the telescopic position of the upper column 42 is performed in the unclamped state.

The output shaft 107 (shown in FIG. 1) projecting frontward (with respect to the vehicle body) from the gear housing 47 is coupled to a pinion engaging with a rack shaft of the steering gear assembly 103 via an intermediate shaft 106 to transmit rotational operation of the steering wheel 101 to the steering apparatus.

The upper bracket 21 is fixedly attached to the vehicle body (not shown) in such a manner that it can be detached upon a secondary collision. As shown in FIG. 4A, the upper bracket 21 is composed of the aforementioned side plates 21b, 21b, an upper plate 21c provided above the side plates 21b, 21b in the vehicle body and bridging them integrally, and flanges 21a, 21a fixedly provided on the upper surface of the upper plate 21c to extend rightward and leftward. As shown in FIG. 3, the structure for attaching the upper bracket 21 to the vehicle body includes two cut grooves 23, 23 provided in pair on the right and left flanges 21a, 21a and capsules 24, 24 fitted to both edges of the cut grooves 23, 23. The cut grooves 23, 23 are symmetrical in structure along the width direction of the vehicle body (vertical direction in FIG. 3) with respect to the center axis of the upper column 42. The capsules 24, 24 hold or sandwich the flanges 21a, 21a from above and below (with respect to the vehicle body).

The upper bracket 21 and the upper column 42 are made of an electrically conductive material such as a metal. The cut grooves 23, 23 open rearward (with respect to the vehicle body) on the flange 21a. The width of the cut grooves 23, 23 along the vertical direction in FIG. 3 or along the width direction of the vehicle body gradually increases from the front to rear (with respect to the vehicle body). This allows easy detachment of the upper bracket 21 from the capsules 24, 24 upon a secondary collision.

The capsules 24, 24 fitted to the cut grooves 23, 23 are made of an electrically conductive material such as a metal or light alloy like aluminum or die-cast zinc alloy. The capsules 24, 24 are each attached to the flange 21a by four shear pins 24a. In addition, the capsules 24, 24 are fixed to the vehicle body by bolts (not shown) passing through bolt holes 24b provided in the capsules 24.

As the driver hits the steering wheel 101 upon a secondary collision to exert a strong impact force on it in the forward direction with respect to the vehicle body, the shear pins 24a shear, and the flange 21a of the upper bracket 21 is detached from the capsules 24 so that the upper bracket 21 makes collapsing movement or move forward with respect to the vehicle body or rightward in FIGS. 2 and 3. Then, the upper column 42 makes collapsing movement or move forward with respect to the vehicle body along the lower column 46 and collapses an energy absorption member to absorb the impact energy of the collision. Upon a secondary collision, the upper column 42 and the upper bracket 21 etc. will move while collapsing the energy absorption member(s). Such a movement is referred to as "collapsing movement" and described as "they (it) make(s) collapsing movement or move(s)" in this specification. The energy absorption member has no direct relevance to the present invention, and it is not described in further detail.

As shown in FIG. 2, an attaching portion 61a provided at the front end (with respect to the vehicle body) of the guide bracket 61 is fixed to the lower bracket 44 by a bolt 62. The guide bracket 61 is produced by bending a metal plate. The attaching portion 61a is arranged to extend in the vertical direction in the vehicle body along the lower bracket 44. At the lower end (with respect to the vehicle body) of the attaching portion 61a, there is provided a guide portion 61b that is bent in an L-shape and extends rearward with respect to the vehicle body. Triangular ribs 61c, 61c connecting the attaching portion 61a and the guide portion 61b are provided in the joining portion of the attaching portion 61a and the guide portion 61b to enhance the rigidity of the guide bracket 61.

The guide portion 61b is disposed a little above (in the vehicle body) the flange 21a of the upper bracket 21 and extends rearward with respect to the vehicle body from the attaching portion 61a along the lower column 46 in parallel to the lower column 46. The guide portion 61b has a length large enough to reach the vicinity of the rear end (with respect to the vehicle body) of the flange 21a. As shown in FIGS. 2 and 4A, the guide portion 61b has, in the central portion with respect to the width direction of the vehicle body, a flat plate portion 61d constituting a flat portion lifted upward (with respect to the vehicle body). The flat plate portion 61d extends rearward (with respect to the vehicle body) from the lower end (with respect to the vehicle body) of the front (with respect to the vehicle body) attaching portion 61a. There is a predetermined gap between the flat plate portion 61d and the flange 21a of the upper bracket 21. The flat plate portion 61d has, in the central portion with respect to the width direction of the vehicle body, a guide groove 63 for guiding the collapsing movement of the upper bracket 21. The guide groove 63 extends in parallel to the center axis of the lower column 46.

If a later-described guide pin 71 were to be attached to the upper bracket 21 in the state in which no gap is left between the flat plate portion 61d and the flange 21a, an error, if any, in the dimension of the thickness of the guide bracket 61 and/or the upper bracket 21 would prevent appropriate tightening of the guide pin 71. In view of this, in the first embodiment, a gap is left between the flat plate portion 61d and the flange 21a, thereby preventing the above situation even if there is a dimension error in the guide bracket 61 etc. to allow appropriate tightening of the guide pin 71. Leaving a gap between the flat plate portion 61d and the flange 21a leads to a decrease in the contact area between the guide bracket 61 and the upper bracket 21 and allows a non-contact arrangement of the guide bracket 61 and the upper bracket 21 in the region near the guide pin 71. Therefore, the frictional resistance between the guide bracket 61 and the upper bracket 21 can be made lower.

The guide groove 63 is arranged to extend in parallel to the center axis of the lower column 46. As shown in FIG. 4A, the flange 21a of the upper bracket 21 has a female screw 22 provided in its central portion with respect to the vehicle width direction. The guide pin 71 shown in FIG. 4B is inserted through the guide groove 63 from above (with respect to the vehicle body), and the male screw 711 at the lower end of the guide pin 71 is screwed into the female screw 22, thereby fixing the guide pin 71 to the flange 21a.

The guide pin 71 is integrally composed of the male screw 711, a cylindrical shaft portion 712 provided on top of the male screw 711 and having a diameter larger than the male screw 711, and a disk-like head portion 713 provided on top of the shaft portion 712 and having a diameter larger than the shaft portion 712. The head portion 713 of the guide pin 71 functions to press down the guide bracket 61 from above to restrict backlash of the upper bracket 21 with respect to the direction perpendicular to the direction of collapsing movement. The guide pin 71 is made of a metal such as iron. A spacer 72 made of a synthetic resin and having a hollow cylindrical shape is externally fitted on the outer circumference of the shaft portion 712. The spacer 72 is made of polyacetal also known by the abbreviated name POM, which has a small friction coefficient and good mechanical properties. The spacer 72 has a lower (with respect to the vehicle body) cylinder portion 721 and a disk-like flange portion 722 provided on top of the cylinder portion 721 and having a diameter larger than the cylinder portion 721.

As the male screw 711 of the guide pin 71 is screwed into the female screw 22, the shoulder surface 714 at the lower end (with respect to the vehicle body) of the shaft portion 712 comes into abutment with the upper surface 211a of the flange 21a to stop. In consequence, the lower surface 715 of the head portion 713 of the guide pin 71 presses the upper surface 723 of the flange portion 722 of the spacer 72. Therefore, the length of the gap between the lower surface 715 and the upper surface 211a is determined by the guide pin 71 that is manufactured in such a way that it has a predetermined length L between the lower surface 715 of the head portion 713 and the shoulder surface 714. The shoulder surface 714 that is integral with the shaft portion 712 constitutes the gap setting portion in the first embodiment of the present invention to set the gap between the lower surface 715 of the head portion 713 and the upper surface 211a to a predetermined length.

The aforementioned length L is designed to be larger than the length of the spacer 72 along its center axis. Specifically, the length L is designed based on the length of the gap between the flat plate portion 61d of the guide bracket 61 and the flange 21a of the upper bracket 21, the thickness of the flat plate portion 61d, and the thickness of the flange portion 722 of the spacer 72 in such a way that when the guide pin 71 is tightened until the shoulder surface 714 comes into abutment with the upper surface 211a of the flange 21a, a predetermined pressing force is exerted on the flat plate portion 61d and the detaching force upon detachment of the upper bracket 21 and the upper column 42 in the frontward direction with respect to the vehicle body by the impact force of a secondary collision is set to a desired value.

As above, the gap between the lower surface 715 of the head portion 713 and the upper surface 211a of the flange 21a is set to a predetermined length by bringing the shoulder surface 714 of the guide pin 71 into abutment with the upper surface 211a of the flange 21a. This enables accurate adjustment of the aforementioned detaching force. This also enables easy tightening of the guide pin 71. In other words, the detaching force can be adjusted by an easy operation, and a reduction in the assembly time can be expected. Moreover, by tightening the guide pin 71 until the shoulder surface 714 comes into abutment with the upper surface 211a of the flange 21a, loosening of the male screw 711 by vibration etc. can be prevented while achieving sufficient axial force of the guide pin 71.

As the head portion 713 of the guide pin 71 presses the upper surface of the flange portion 722 of the spacer 72 by a predetermined pressing force as described above, the upper bracket 21 is attached to the guide bracket 61 without play, and the collapse load of the upper bracket 21 can be set to a predetermined load. The spacer 72 also has the function of eliminating noises that would otherwise be generated by direct interference of the guide pin 71 and the flat plate portion 61d of the guide bracket 61 caused by vibration or other reasons. Furthermore, the spacer 72 can eliminate variations in collapse load that might result, for example, from small deformation of the guide bracket 61, dimension errors of the guide groove 63, and/or blanking burr on the guide groove 63 made by pressing in the process of manufacturing the guide bracket 61. The spacer 72 also has the function of reducing the rotational load on the upper bracket 21 or the load acting on the upper bracket 21 in the rotational direction about the guide pin 71.

As shown in FIG. 5, the upper surface 723 of the flange portion 722 of the spacer 72 has projections 724 projecting upward with respect to the vehicle body (upward in FIG. 5). There are six projections 724 arranged on the same circle on the upper surface 723 at angular intervals of 60 degrees. The projection 724 is short in the length along the circumferential direction, and its cross section taken on a vertical plane containing the center axis of the spacer 72 has a trapezoidal shape with the length of the top side that faces upward with respect to the vehicle body being shorter than the length of the bottom side that faces downward with respect the vehicle body on the upper surface 723. Therefore, the area of the cross section of the projection 724 taken on a plane perpendicular to the center axis of the spacer 72 decreases upward with respect to the vehicle body from the upper surface 723. In consequence, the area of the projection 724 that is in contact with the lower surface 715 of the head portion 713 of the guide pin 71 is small, and the projection 724 can easily be deformed plastically by a small pressing force.

As the male screw 711 of the guide pin 71 is screwed into the female screw 22, the lower surface 715 of the head portion 713 of the guide pin 71 presses the upper surface of the projections 724 to plastically deform or crush the projections 724. Mere fixing of the guide pin 71 to the upper bracket 21 causes the head portion 713 of the guide pin 71 to press the projections 724 by its lower surface 715 to plastically deform or crush them. This provides a restriction of backlash of the upper bracket 21 in the direction perpendicular to the direction of collapsing movement. Therefore, the operation of adjusting the backlash can be eliminated, assembly can be carried out without skill, and assembly time will be shortened.

As above, even if there are manufacturing errors in the dimension of the height of the upper bracket 21, the guide bracket 61 or other parts along the vertical direction with respect to the vehicle body, the manufacturing errors will be absorbed by the crushing of the projections 724. Thus, the upper bracket 21 is attached to the guide bracket 61 without backlash or without play of the upper bracket 21 in the direction perpendicular to the direction of collapsing movement. Moreover, since the crushing of the projections 724 restrains the pressing force exerted by the lower surface 715 of the head portion 713 to the upper surface of the projections 724, the load that causes the detachment of the upper bracket 21 from the guide bracket 61 can be made small and constant.

If the driver hits the steering wheel 101 upon a secondary collision to exert a strong impact force on it in the forward direction with respect to the vehicle body, the shear pins 24a shear, and the flange 21a of the upper bracket 21 is detached from the capsules 24 and makes collapsing movement or moves forward with respect to the vehicle body (or rightward in FIGS. 2 and 3). Then, the guide pin 71 makes collapsing movement or moves forward with respect to the vehicle body together with the spacer 72.

When the impact load upon a secondary collision acts on the upper column 42, since the force exerted by the lower surface 715 of the head portion 713 to the upper surface of the projections 724 is small and set to be constant and the upper bracket 21 is attached to the guide bracket 61 without backlash, the load upon the start of the collapsing movement of the upper column 42 will be small and constant.

Moreover, since the spacer 72 is made of a synthetic resin, there is no metallic contact between the guide groove 63 and the guide pin 71, leading to low friction coefficient between the guide groove 63 and the cylinder portion 721 of the spacer 72. Therefore, the performance in absorbing the impact energy upon a secondary collision is stable, and the impact load absorption characteristics can be set accurately.

<First Modification of First Embodiment>

Figure 6:
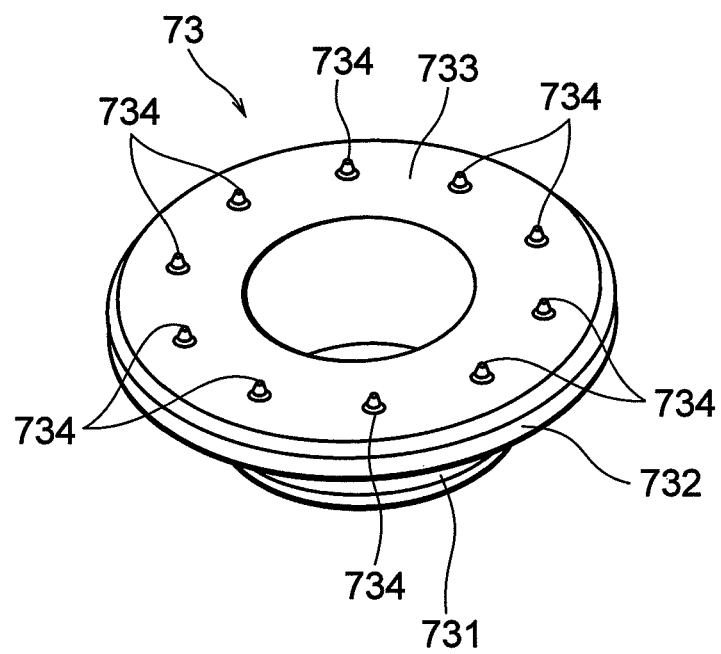
FIG. 6 is a perspective view of the resin spacer in a first modification of the first embodiment of the present invention.

A first modification of the first embodiment of the present invention will be described. FIG. 6 is a perspective view of a resin spacer in the first modification of the first embodiment of the present invention. In the following description, only the portions that are different from those in the above-described first embodiment will be described, and redundant descriptions will not be made. The same parts will be denoted by the same reference numerals in the description. The first modification pertains to a modification of the resin spacer in the first embodiment. In the modification, the shape of the projection projecting upward with respect to the vehicle body from the upper surface of the flange portion is modified.

As shown in FIG. 6, the hollow cylindrical spacer 73 made of a synthetic resin in the first modification has a lower (with respect to the vehicle body) cylinder portion 731 and a disklike flange portion 732 having a diameter larger than the cylinder portion 731 on top of the cylinder portion 731.

The upper surface 733 of the flange portion 732 of the spacer 73 has projections 734 projecting upward with respect to the vehicle body (upward in FIG. 6). There are ten projections 734 arranged on the same circle on the upper surface 733 at angular intervals of 36 degrees. The projection 734 has a conical shape having a small circular bottom and truncated near its top facing upward with respect to the vehicle body. In consequence, the area of projection 734 that is in contact with the lower surface 715 of the head portion 713 of the guide pin 71 is small, and the projection 734 can easily be deformed plastically by a small pressing force.

Thus, mere fixing of the guide pin 71 to the upper bracket 21 provides a restriction of backlash of the upper bracket 21 in the direction perpendicular to the direction of collapsing movement. Therefore, the operation of adjusting the backlash can be eliminated, assembly can be carried out without skill, and assembly time will be shortened. Moreover, since the crushing of the projections 734 reduces the pressing force exerted by the lower surface 715 of the head portion 713 to the upper surface of the projections 734, the load that causes the detachment of the upper bracket 21 from the bracket 61 can be made small and constant. Furthermore, since the spacer 73 is made of a synthetic resin, the friction coefficient between the guide groove 63 and the cylinder portion 731 of the spacer 73 can be made small.

<Second Modification of First Embodiment>

Figure 7:
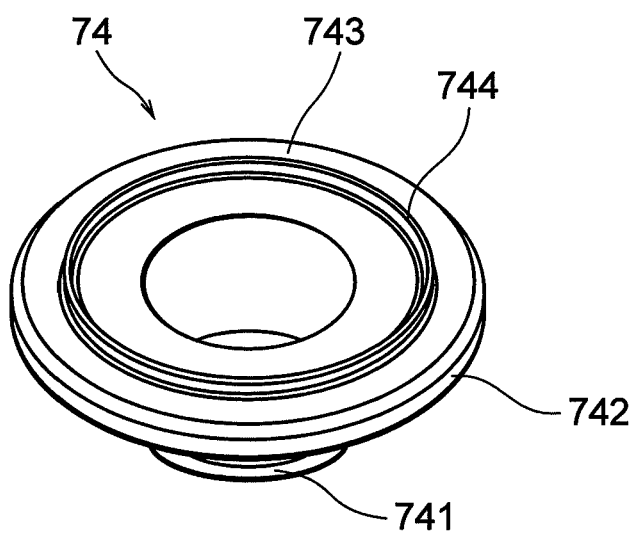
FIG. 7 is a perspective view of the resin spacer in a second modification of the first embodiment of the present invention.

A second modification of the first embodiment of the present invention will be described. FIG. 7 is a perspective view of a resin spacer in the second modification of the first embodiment of the present invention. In the following description, only the portions that are different from those in the above-described first embodiment will be described, and redundant descriptions will not be made. The same parts will be denoted by the same reference numerals in the description. The second modification pertains to a modification of the resin spacer in the first embodiment. In the modification, the shape of the projection projecting upward with respect to the vehicle body from the upper surface of the flange portion is modified.

As shown in FIG. 7, the hollow cylindrical spacer 74 made of a synthetic resin in the second modification has a lower (with respect to the vehicle body) cylinder portion 741 and a disk-like flange portion 742 having a diameter larger than the cylinder portion 741 on top of the cylinder portion 741.

The upper surface 743 of the flange portion 742 of the spacer 74 has a projection 744 projecting upward with respect to the vehicle body (upward in FIG. 7). There is one projection 744 having an annular shape concentric with the flange portion 742. The cross section of the projection 744 taken on a vertical plane containing the center axis of the spacer 74 has a trapezoidal shape with the length of the top side that faces upward with respect to the vehicle body being shorter than the length of the bottom side that faces downward with respect the vehicle body on the upper surface 743. Therefore, the area of the projection 744 that is in contact with the lower surface 715 of the head portion 713 of the guide pin 71 is small, and the projection 744 can easily be deformed plastically by a small pressing force.

Thus, mere fixing of the guide pin 71 to the upper bracket 21 provides a restriction of backlash of the upper bracket 21 in the direction perpendicular to the direction of collapsing movement. Therefore, the operation of adjusting the backlash can be eliminated, assembly can be carried out without skill, and assembly time will be shortened. Moreover, since the crushing of the projection 744 reduces the pressing force exerted by the lower surface 715 of the head portion 713 to the upper surface of the projection 744, the load that causes the detachment of the upper bracket 21 from the bracket 61 can be made small and constant. Furthermore, since the spacer 74 is made of a synthetic resin, the friction coefficient between the guide groove 63 and the cylinder portion 741 of the spacer 74 can be made small.

<Third Modification of First Embodiment>

Figure 8A:
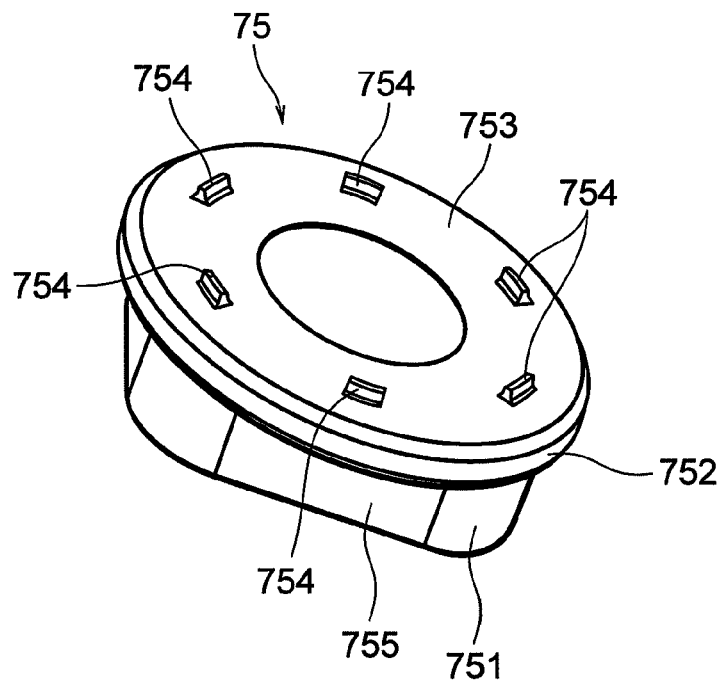
FIGS. 8A and 8B are perspective views of a resin spacer in a third modification of the first embodiment of the present invention, where
Figure 8B:
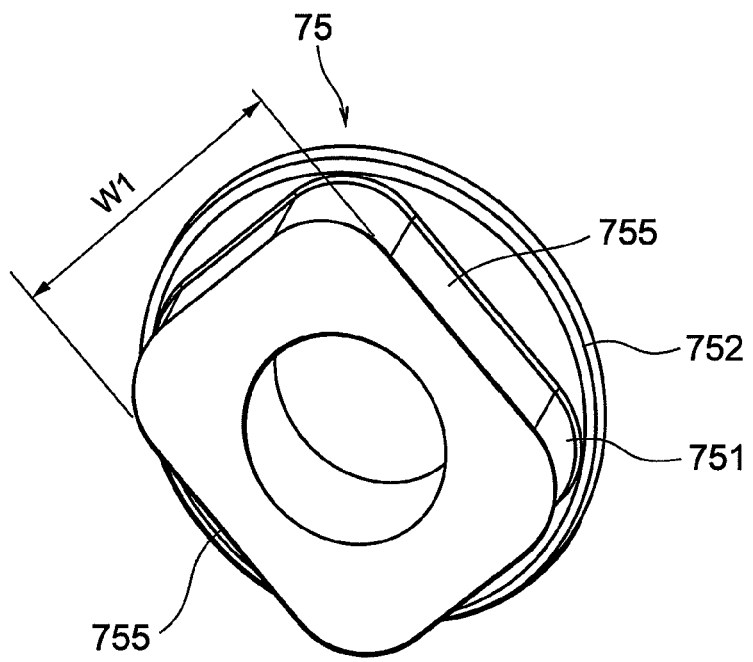

A third modification of the first embodiment of the present invention will be described. FIG. 8 includes perspective views of a resin spacer in the third modification of the first embodiment of the present invention, where FIG. 8A is a perspective view as seen from the upper surface side of the flange portion, and FIG. 8B is a perspective view as seen from below in FIG. 8A. In the following description, only the portions that are different from those in the above-described first embodiment will be described, and redundant descriptions will not be made. The same parts will be denoted by the same reference numerals in the description. The third modification pertains to a modification of the resin spacer in the first embodiment. In the modification, the spacer has on the outer circumferential surface thereof two parallel flat portions which are in contact with the guide groove 63 to be able to make collapsing movement or move.

As shown in FIG. 8, the hollow cylindrical spacer 75 made of a synthetic resin in the third modification has a lower (with respect to the vehicle body) rectangular cylinder portion 751 and a disk-like flange portion 752 having a diameter larger than the rectangular cylinder portion 751 on top of the rectangular cylinder portion 751. The rectangular cylinder portion 751 has flat portions 755, 755 that are parallel to each other. The width W1 between the flat portions 755, 755 is so dimensioned that they are fitted into the guide groove 63 with a slight gap.

Since the flat portions 755, 755 provide an increased contact area between the guide groove 63 and the spacer 75, the surface pressure on the contact surface can be made smaller. In consequence, scuffing on the contact surface upon detachment of the upper bracket 21 from the guide bracket 61 and during collapsing movement of the upper bracket 21 along the guide bracket 61 can be prevented.

The upper surface 753 of the flange portion 752 of the spacer 75 has projections 754 projecting upward with respect to the vehicle body (upward in FIG. 8A). There are six projections 754 arranged on the same circle on the upper surface 753 at angular intervals of 60 degrees. The projection 754 is short in the length along the circumferential direction, and its cross section taken on a vertical plane containing the center axis of the spacer 75 has a trapezoidal shape with the length of the top side that faces upward with respect to the vehicle body being shorter than the length of the bottom side that faces downward with respect the vehicle body on the upper surface 753. Therefore, the area of the projection 754 that is in contact with the lower surface 715 of the head portion 713 of the guide pin 71 is small, and the projection 754 can easily be deformed plastically by a small pressing force.

Thus, mere fixing of the guide pin 71 to the upper bracket 21 provides a restriction of backlash of the upper bracket 21 in the direction perpendicular to the direction of collapsing movement. Therefore, the operation of adjusting the backlash can be eliminated, assembly can be carried out without skill, and assembly time will be shortened. Moreover, since the crushing of the projections 754 reduces the pressing force exerted by the lower surface 715 of the head portion 713 to the upper surface of the projections 754, the load that causes the detachment of the upper bracket 21 from the bracket 61 can be made small and constant. Furthermore, since the spacer 75 is made of a synthetic resin, the friction coefficient between the guide groove 63 and the flat portions 755, 755 of the spacer 75 can be made small.

<Fourth Modification of First Embodiment>

Figure 9A:
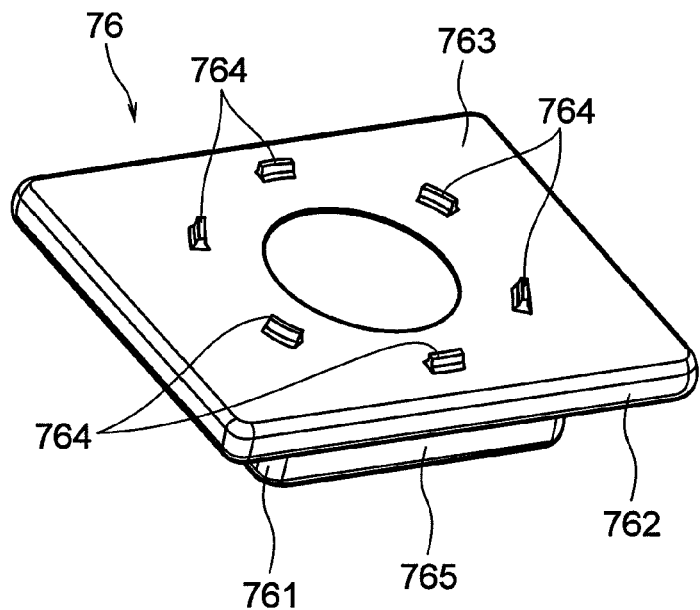
FIGS. 9A and 9B are perspective views of a resin spacer in a fourth modification of the first embodiment of the present invention, where
Figure 9B:
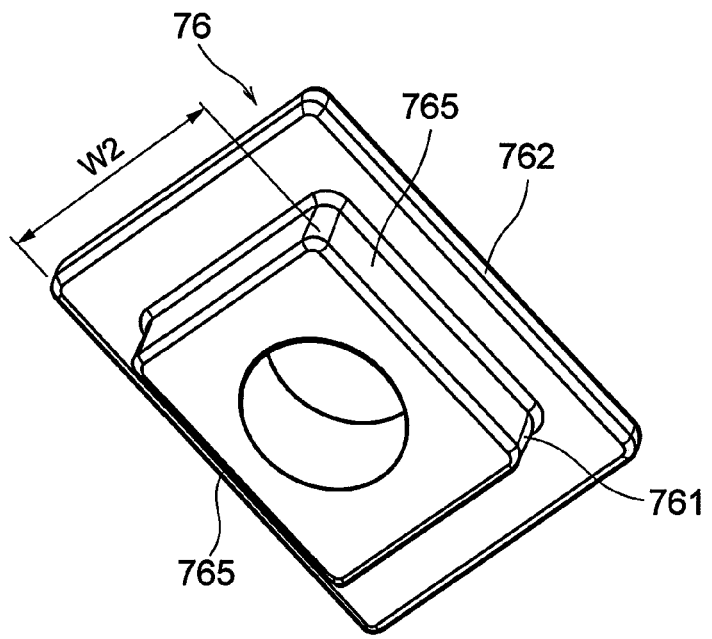

A fourth modification of the first embodiment of the present invention will be described. FIG. 9 includes perspective views of a resin spacer in the fourth modification of the first embodiment of the present invention, where FIG. 9A is a perspective view as seen from the upper surface side of the flange portion, and FIG. 9B is a perspective view as seen from below in FIG. 9A. In the following description, only the portions that are different from those in the above-described first embodiment will be described, and redundant descriptions will not be made. The same parts will be denoted by the same reference numerals in the description. The fourth modification pertains to a modification of the resin spacer in the first embodiment. In the modification, the spacer has on the outer circumferential surface thereof two parallel flat portions 765, 765 which are in contact with the guide groove 63 and can make collapsing movement or move, and the flange portion of the spacer is shaped in a rectangular shape.

As shown in FIGS. 9A and 9B, the hollow cylindrical spacer 76 made of a synthetic resin in the fourth modification has a lower (with respect to the vehicle body) rectangular cylinder portion 761 and a rectangular flange portion 762 having sides longer than the sides of the rectangular cylinder portion 761 on top of the rectangular cylinder portion 761. The rectangular cylinder portion 761 has flat portions 765, 765 that are parallel to each other. The width W2 between the flat portions 765, 765 is so dimensioned that they are fitted into the guide groove 63 with a slight gap.

Since the flat portions 765, 765 provide an increased contact area between the guide groove 63 and the flat portions 765, 765, the surface pressure on the contact surface can be made smaller. In consequence, scuffing on the contact surface upon detachment of the upper bracket 21 from the guide bracket 61 and during collapsing movement of the upper bracket 21 along the guide bracket 61 can be prevented.

The upper surface 763 of the flange portion 762 of the spacer 76 has projections 764 projecting upward with respect to the vehicle body (upward in FIG. 9A). There are six projections 764 arranged on the same circle on the upper surface 763 at angular intervals of 60 degrees. The projection 764 is short in the length along the circumferential direction, and its cross section taken on a vertical plane containing the center axis of the spacer 76 has a trapezoidal shape with the length of the top side that faces upward with respect to the vehicle body being shorter than the length of the bottom side that faces downward with respect the vehicle body on the upper surface 763. Therefore, the area of the projection 764 that is in contact with the lower surface 715 of the head portion 713 of the guide pin 71 is small, and the projection 764 can easily be deformed plastically by a small pressing force.

Thus, mere fixing of the guide pin 71 to the upper bracket 21 provides a restriction of backlash of the upper bracket 21 in the direction perpendicular to the direction of collapsing movement. Therefore, the operation of adjusting the backlash can be eliminated, assembly can be carried out without skill, and assembly time will be shortened. Moreover, since the crushing of the projections 764 reduces the pressing force exerted by the lower surface 715 of the head portion 713 to the upper surface of the projections 764, the load that causes the detachment of the upper bracket 21 from the bracket 61 can be made small and constant. Furthermore, since the spacer 76 is made of a synthetic resin, the friction coefficient between the guide groove 63 and the flat portions 765, 765 of the spacer 76 can be made small.

<Fifth Modification of First Embodiment>

Figure 10:
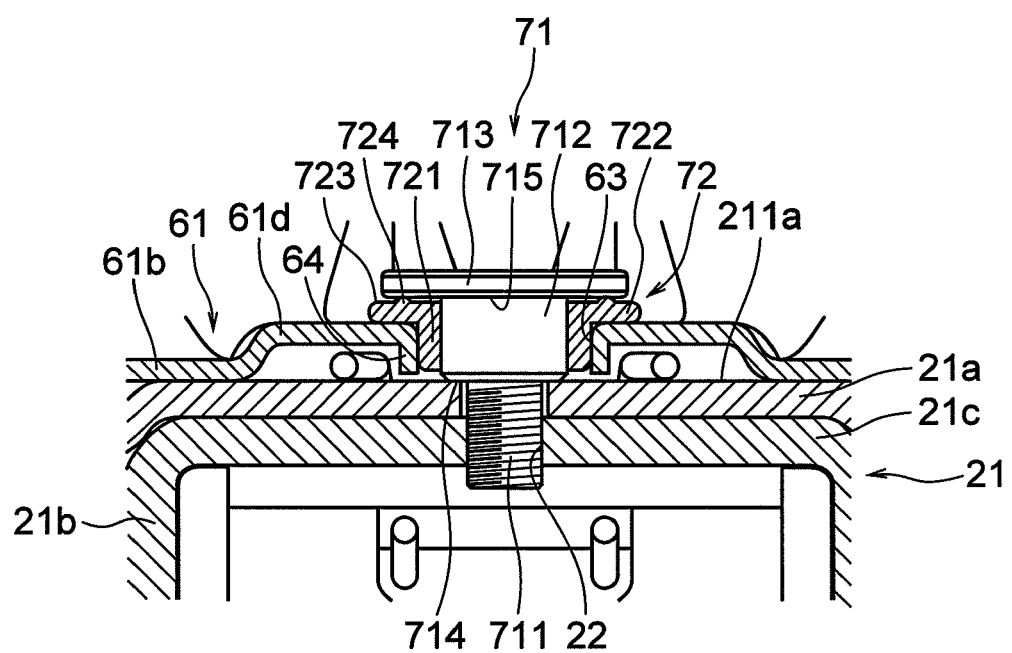
FIG. 10 is a view similar to FIG. 4, showing a portion in which a resin spacer and a guide groove are in contact in the fifth modification of the first embodiment of the present invention.

A fifth modification of the first embodiment of the present invention will be described. FIG. 10 is a view similar to FIG. 4 showing a portion in which a resin spacer and a guide groove are in contact in the fifth modification of the first embodiment of the present invention. In the following description, only the portions that are different from those in the above-described first embodiment will be described, and redundant descriptions will not be made. The same parts will be denoted by the same reference numerals in the description. The fifth modification is a modification of the first embodiment. In the modification, the circumferential edge of the guide groove is bent to enlarge the contact area between the cylinder portion 721 of the spacer 72 and the guide groove 63.

As shown in FIG. 10, the guide portion 61b of the guide bracket 61 has, in its central portion with respect to the width direction of the vehicle body, a guide groove 63 for guiding the collapsing movement of the upper bracket 21. The circumferential edge of the guide groove 63 is bent by burring to form a rising portion 64 extending downward with respect to the vehicle body, thereby enlarging the contact area with the cylinder portion 721 of the spacer 72.

Since the contact area between the guide groove 63 and the cylinder portion 721 of the spacer 72 is enlarged by burring, the contact pressure between the guide groove 63 and the cylinder portion 721 is decreased. Moreover, the surface in contact with the cylinder portion 721 is not a press-cut surface, the surface in contact with the cylinder portion 721 is smooth. In consequence, when it is used with the spacer 72 made of a resin, the performance in absorbing the impact energy upon a secondary collision will be stable, and the impact load absorption characteristics can be set accurately.

<Sixth Modification of First Embodiment>

Figure 11A:
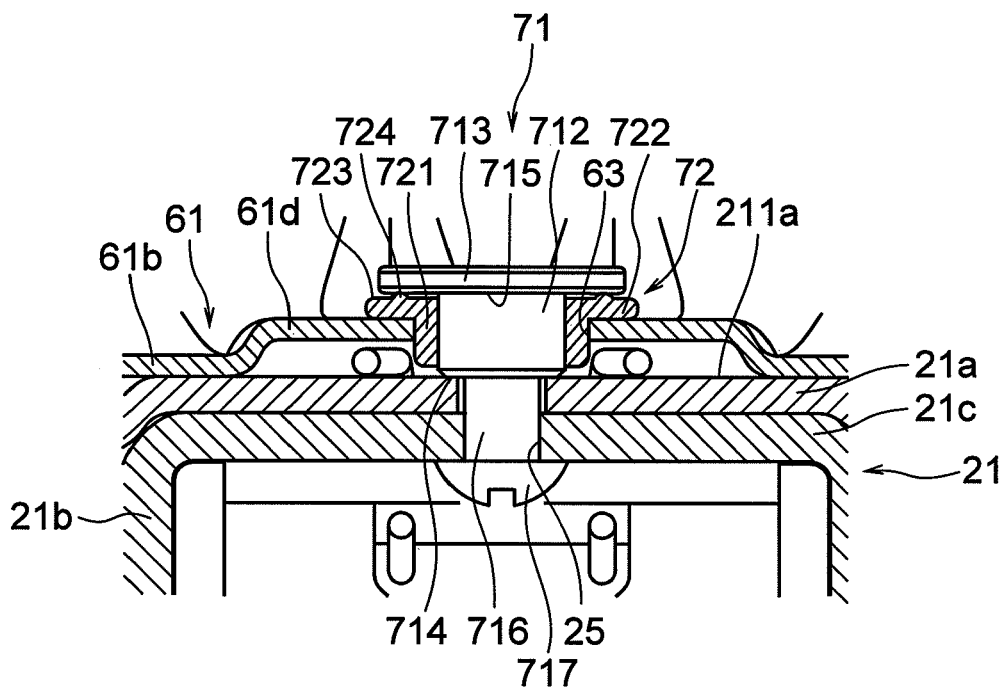
FIG. 11A is a view similar to FIG. 4, showing a portion in which a resin spacer and a guide groove are in contact in a sixth modification of the first embodiment of the present invention.
Figure 11B:
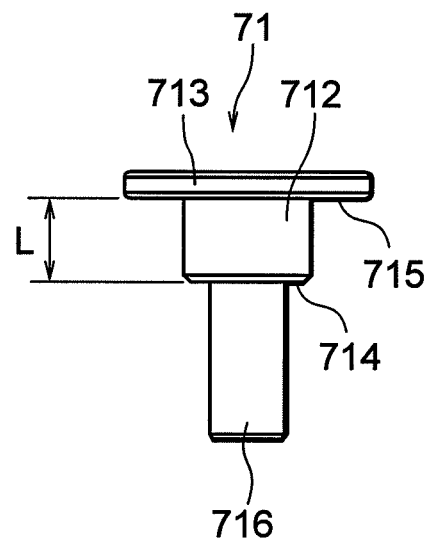
FIG. 11B is a front view showing the guide pin shown in FIG. 11A alone.

A sixth modification of the first embodiment of the present invention will be described. FIG. 11A is a view similar to FIG. 4 showing a portion in which a resin spacer and a guide groove are in contact in the sixth modification of the first embodiment of the present invention. FIG. 11B is a front view showing the guide pin shown in FIG. 11A alone. In the following description, only the portions that are different from those in the above-described first embodiment will be described, and redundant descriptions will not be made. The same parts will be denoted by the same reference numerals in the description. The sixth modification is a modification of the first embodiment. In the modification, the guide pin 71 is fixedly attached to the upper bracket 21 by swaging.

As shown in FIG. 11A, the flange 21a of the upper bracket 1 has a through hole 25 provided at its center with respect to the vehicle width direction. The guide pin 71 is inserted through the guide groove 63 from above (with respect to the vehicle body) to cause a small diameter shaft portion 716 in the lower part of the guide pin 71 to pass through the through hole 25. The axial length of the small-diameter portion 716 is longer than the male screw 711 in the first embodiment. Then, the lower end of the small-diameter portion 716 projecting out of the through-hole 25 is plastically deformed by swaging into a hemispherical head portion 717, thereby fixing the guide pin 71 to the flange 21a.

The guide pin 71 is integrally composed of the small-diameter portion 716, a cylindrical shaft portion 712 provided on top of the small-diameter portion 716 and having a diameter larger than the small-diameter portion 716, and a disk-like head portion 713 provided on top of the shaft portion 712 and having a diameter larger than the shaft portion 712. The guide pin 71 is made of a metal such as iron. A spacer 72 is externally fitted on the outer circumference of the shaft portion 712. The spacer 72 has a structure the same as that in the first embodiment, and details thereof will not be described.

As the guide pin 71 is fixed to the flange 21a by swaging the lower end of the small-diameter portion 716 of the guide pin 71 to plastically deform it, the shoulder surface 714 at the lower end (with respect to the vehicle body) of the shaft portion 712 comes into abutment with the upper surface 211a of the flange 21a to stop. In consequence, the lower surface 715 of the head portion 713 of the guide pin 71 presses the upper surface of the flange portion 722 of the spacer 72. Thus, variations in the amount of crushing or plastic deformation of the projections is controlled by the accuracy in the dimension of the guide pin 71 by itself. Therefore, assembly can be carried out without skill, and assembly time will be shortened.

<Seventh Modification of First Embodiment>

Figure 12A:
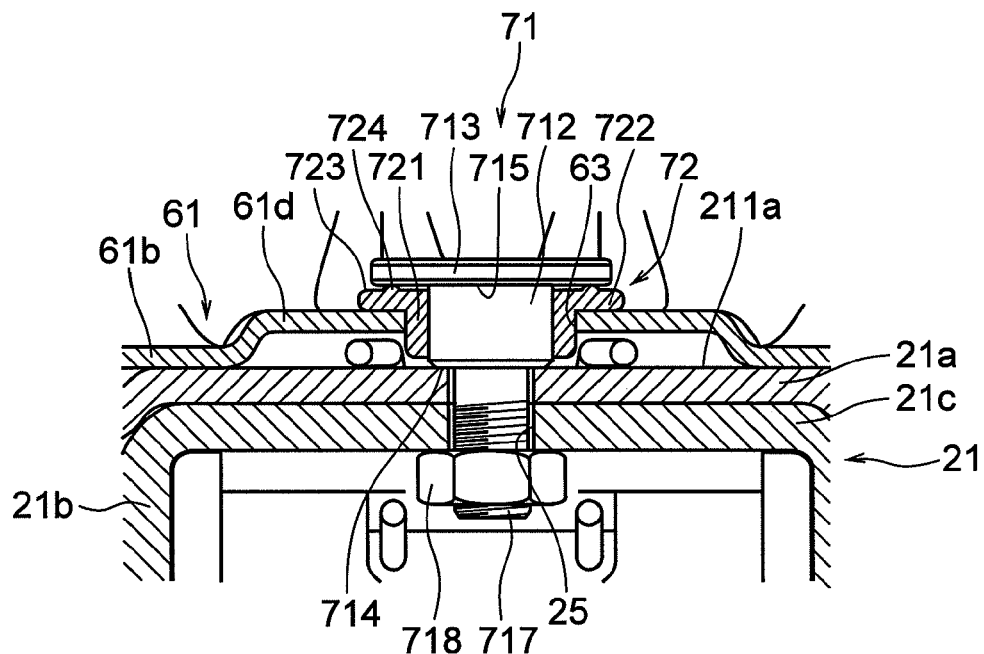
FIG. 12A is a view similar to FIG. 4, showing a portion in which a resin spacer and a guide groove are in contact in a seventh modification of the first embodiment of the present invention.
Figure 12B:
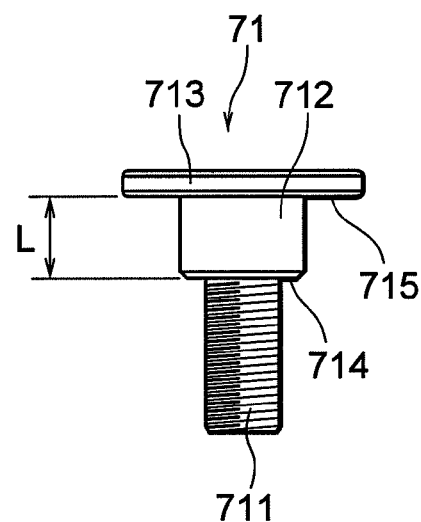
FIG. 12B is a front view showing the guide pin shown in FIG. 12A alone.

A seventh modification of the first embodiment of the present invention will be described. FIG. 12A is a view similar to FIG. 4 showing a portion in which a resin spacer and a guide groove are in contact in the seventh modification of the first embodiment of the present invention. FIG. 12B is a front view showing the guide pin shown in FIG. 12A alone. In the following description, only the portions that are different from those in the above-described first embodiment will be described, and redundant descriptions will not be made. The same parts will be denoted by the same reference numerals in the description. The seventh modification is a modification of the first embodiment. In the modification, the guide pin 71 is fixed to the upper bracket 21 by screwing a nut 718 to the male screw of the guide pin 71.

As shown in FIG. 12A, the flange 21a of the upper bracket 21 has a through hole 25 provided at its center with respect to the vehicle width direction. The guide pin 71 is inserted through the guide groove 63 from above (with respect to the vehicle body) to cause a male screw 711 in the lower part of the guide pin 71 to pass through the through hole 25. The axial length of the male screw 711 is longer than the male screw 711 in the first embodiment. Then, a nut 718 is screwed to the male screw 711 sticking out from the through hole 25, and the nut 718 is tightened against the lower surface of the flange 21a, thereby fixing the guide pin 71 to the flange 21a.

The guide pin 71 is integrally composed of the male screw 711, a cylindrical shaft portion 712 provided on top of the male screw 711 and having a diameter larger than the male screw 711, and a disk-like head portion 713 provided on top of the shaft portion 712 and having a diameter larger than the shaft portion 712. The guide pin 71 is made of a metal such as iron. A spacer 72 is externally fitted on the outer circumference of the shaft portion 712. The spacer 72 has a structure the same as that in the first embodiment, and details thereof will not be described.

As the guide pin 71 is fixed to the flange 21a by screwing the nut 718 to the lower end of the male screw 711 of the guide pin 71, the shoulder surface 714 at the lower end (with respect to the vehicle body) of the shaft portion 712 comes into abutment with the upper surface 211a of the flange 21a to stop. In consequence, the lower surface 715 of the head portion 713 of the guide pin 71 presses the upper surface of the flange portion 722 of the spacer 72. Thus, variations in the amount of crushing or plastic deformation of the projections is controlled by the accuracy in the dimension of the guide pin 71 by itself. Therefore, assembly can be carried out without skill, and assembly time will be shortened.

<Eighth Modification of First Embodiment>

Figure 13A:
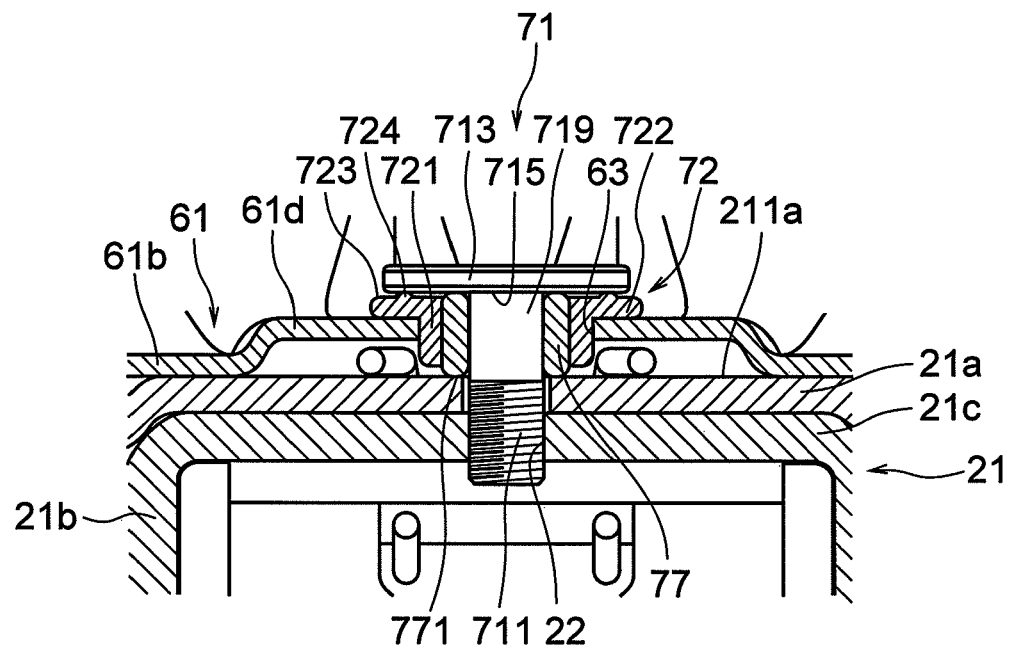
FIG. 13A is a view similar to FIG. 4, showing a portion in which a resin spacer and a guide groove are in contact in an eighth modification of the first embodiment of the present invention.
Figure 13B:
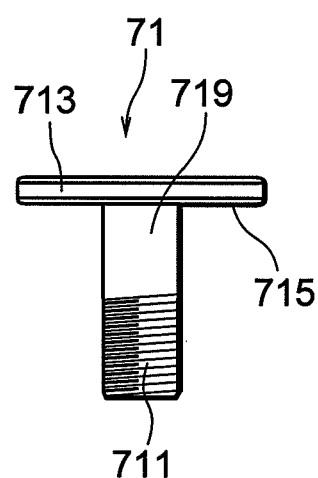
FIG. 13B is a front view showing the guide pin shown in FIG. 13A alone.
Figure 13C:
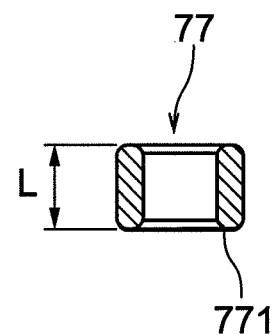
FIG. 13C is a cross sectional view showing the sleeve in FIG. 13A alone.

An eighth modification of the first embodiment of the present invention will be described. FIG. 13A is a view similar to FIG. 4 showing a portion in which a resin spacer and a guide groove are in contact in the eighth modification of the first embodiment of the present invention. FIG. 13B is a front view showing the guide pin shown in FIG. 13A alone. FIG. 13C is a cross sectional view showing the sleeve shown in FIG. 13A alone. In the following description, only the portions that are different from those in the above-described first embodiment will be described, and redundant descriptions will not be made. The same parts will be denoted by the same reference numerals in the description.

The eighth modification is a modification of the first embodiment. In the modification, a hollow cylindrical sleeve 77 is used as a gap setting part that sets the length of the gap between the lower surface 715 of the head portion 713 and the upper surface 211a to a predetermined value.

As shown in FIG. 13A, the flange 21a of the upper bracket 21 has a female screw 22 provided in the central portion with respect to the vehicle width direction. The guide pin 71 is inserted through the guide groove 63 from above (with respect to the vehicle body), and the male screw 711 at the lower end of the guide pin 71 is screwed into the female screw 22, thereby fixing the guide pin 71 to the flange 21a.

The guide pin 71 is integrally composed of the male screw 711, a cylindrical shaft portion 719 provided on top of the male screw 711 and having a diameter substantially equal to the diameter of the male screw 711, and a disk-like head portion 713 provided on top of the shaft portion 719 and having a diameter larger than the shaft portion 719. The guide pin 71 is made of a metal such as iron. A hollow cylindrical sleeve 77 is externally fitted on the outer circumference of the shaft portion 719. The sleeve 77 is made of a metal such as iron. A spacer 72 is externally fitted on the outer circumference of the sleeve 77. The spacer 72 has a structure the same as that in the first embodiment, and details thereof will not be described.

As the male screw 711 of the guide pin 71 is screwed into the female screw 22, the lower (with respect to the vehicle body) end face 771 of the sleeve 77 comes into abutment with the upper surface 211a of the flange 21a to stop. In consequence, the lower surface 715 of the head portion 713 of the guide pin 71 presses the upper surface of the flange portion 722 of the spacer 72. Therefore, the length of the gap between the lower surface 715 of the head portion 713 and the upper surface 211a is determined by the sleeve 77 that is manufactured a way that it has a predetermined axial length L. The hollow cylindrical sleeve 77 constitutes the gap setting portion in the eighth modification of the first embodiment to set the gap between the lower surface 715 of the head portion 713 and the upper surface 211a to a predetermined length.

The length L of the sleeve 77 is designed to be larger than the length of the spacer 72 along its center axis. Specifically, the length L of the sleeve 77 is designed based on the length of the gap between the flat plate portion 61d of the guide bracket 61 and the flange 21a of the upper bracket 21, the thickness of the flat plate portion 61d, and the thickness of the flange portion 722 of the spacer 72 in such a way that when the guide pin 71 is tightened until the lower surface 715 of head portion 713 comes into abutment with the upper surface of the sleeve and the lower surface of the sleeve 77 comes into abutment with the upper surface 211a of the flange 21a, a predetermined pressing force is exerted on the flat plate portion 61d and the detaching force upon detachment of the upper bracket 21 and the upper column 42 in the frontward direction with respect to the vehicle body by the impact force of a secondary collision is set to a desired value.

As the male screw 711 of the guide pin 71 is screwed into the female screw 22, the lower surface 715 of the head portion 713 of the guide pin 71 presses the upper surface of the projections 724 of the spacer 7 to plastically deform or crush the projections 724. Mere fixing of the guide pin 71 with the externally fitted sleeve 77 provides a restriction of backlash of the upper bracket 21 in the direction perpendicular to the direction of collapsing movement. Therefore, the operation of adjusting the backlash can be eliminated, assembly can be carried out without skill, and assembly time will be shortened.

While in the first embodiment and the first to eighth modifications thereof, there have been described cases in which the present invention is applied to a tilt-telescopic type steering apparatus in which the tilt position and the telescopic position of the column are both adjusted, the present invention may be applied to a tilt type steering apparatus, a telescopic type steering apparatus, and a steering apparatus that allows adjustment of neither the tilt position nor telescopic position.

The shape of the guide groove 63 of the guide bracket 61 in the first embodiment of the present invention and the first to eighth modifications thereto is not limited to that described above, but its shape may be modified to that in the second embodiment and first to sixth modification thereof, which will be described in the following. The modified shape will reduce and stabilize the frictional resistance between the guide pin 71 and the guide groove 63 during the collapsing movement. Thus, a steering apparatus in which the impact absorption load upon a secondary collision can be set accurately can be provided.

In the following, the second embodiment and the first to sixth modifications thereof will be described with reference to the drawings.

Second Embodiment

Figure 14:
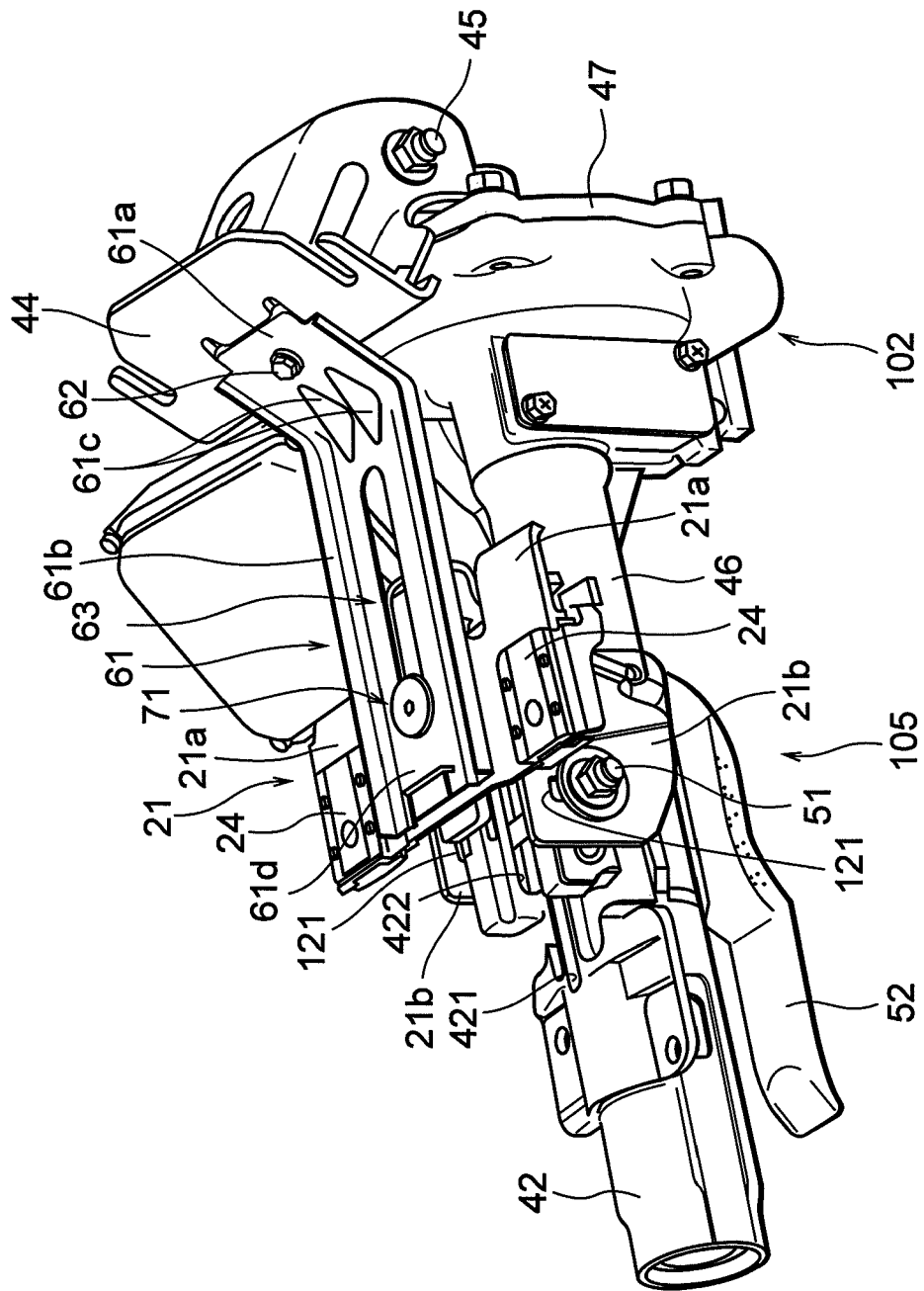
FIG. 14 is a perspective view of the relevant portions of the steering apparatus according to a second embodiment of the present invention, seen from above right from the rear of the vehicle body.
Figure 15:
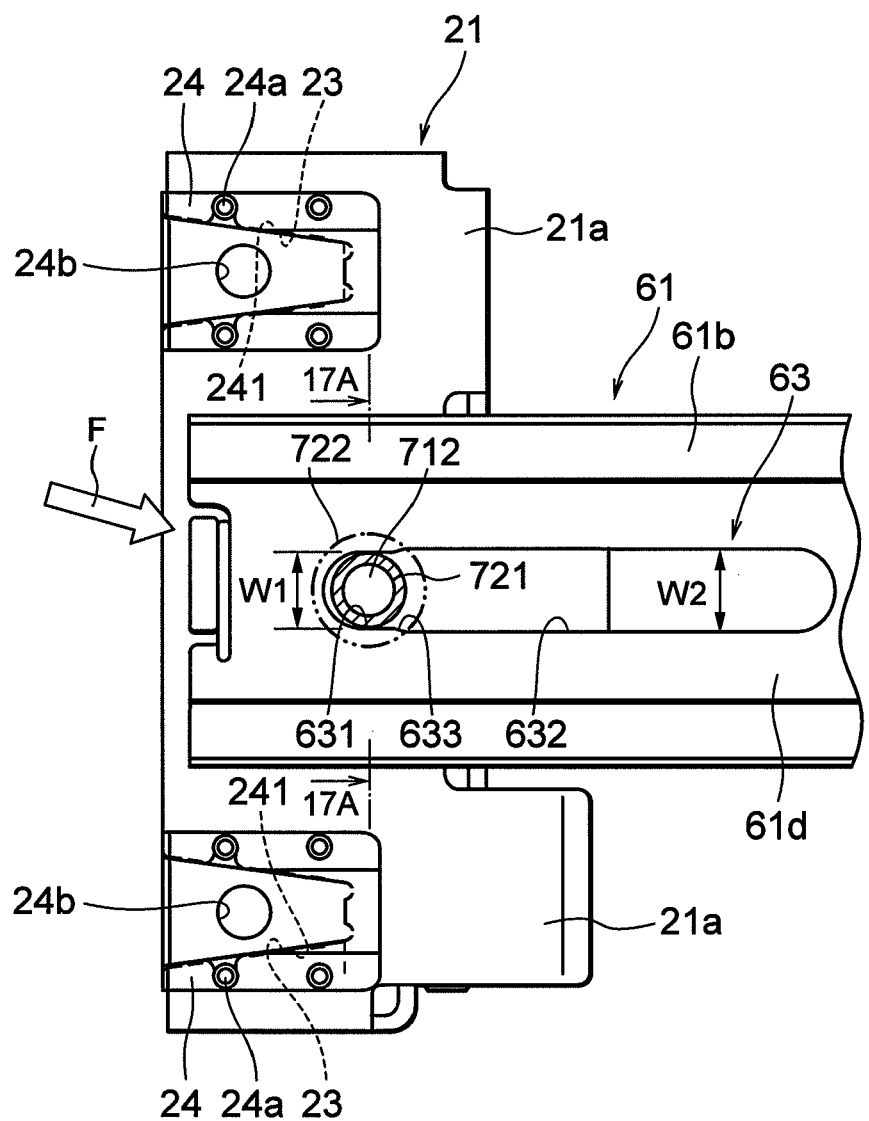
FIG. 15 is a top view of a guide bracket in FIG. 14, showing its rear (with respect to the vehicle body) portion.
Figure 16:
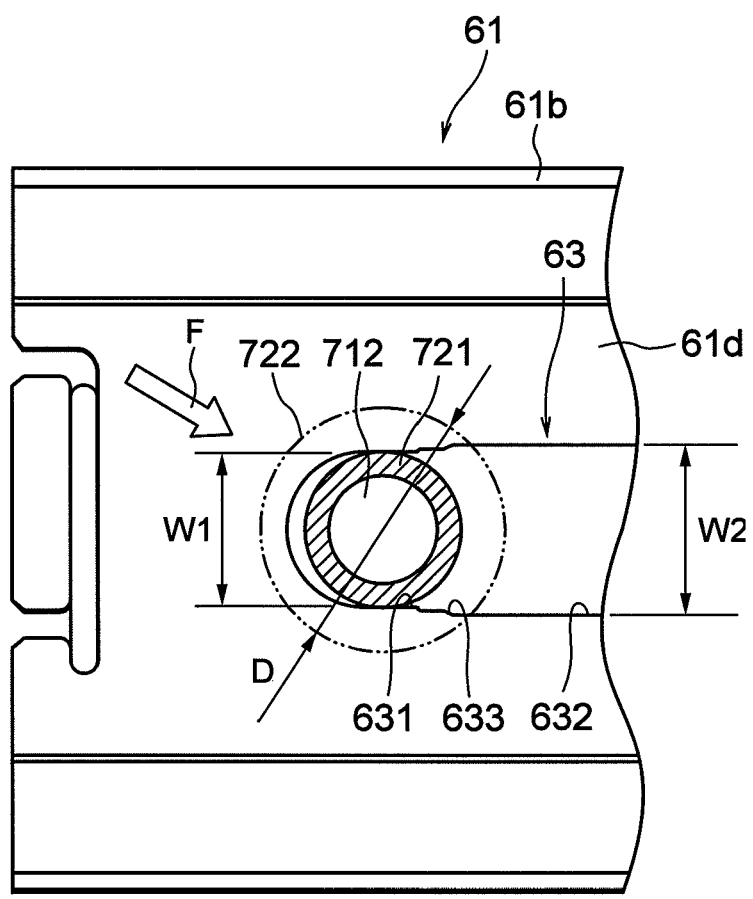
FIG. 16 is an enlarged top view of a portion of the guide groove of the guide bracket near its rear end with respect to the vehicle body.
Figure 17:
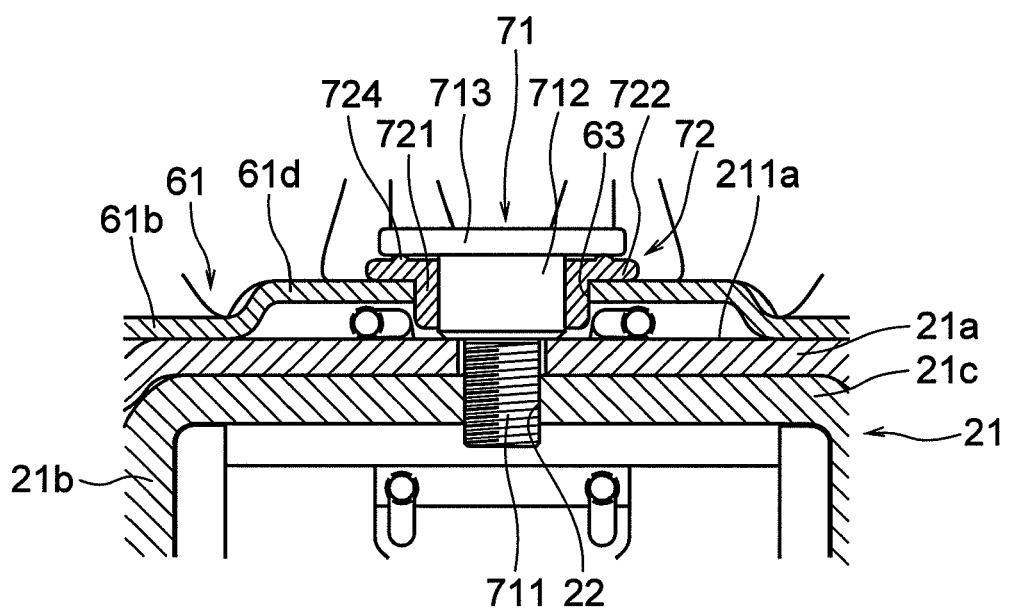
FIG. 17 is a cross sectional view taken along line 17A-17A in FIG. 15, showing the portion in which a guide pin and a guide groove are in contact.

FIG. 14 is a perspective view of the relevant portions of the steering apparatus according to the second embodiment of the present invention seen from above right from the rear of the vehicle body. FIG. 15 is a top view of a guide bracket in FIG. 14, showing its rear (with respect to the vehicle body) portion. FIG. 16 is an enlarged top view of a portion of the guide groove of the guide bracket shown in FIG. 15 near its rear end with respect to the vehicle body. FIG. 17 is a cross sectional view taken along line 17A-17A in FIG. 15 showing the portion in which a guide pin and a guide groove are in contact.

As shown in FIGS. 14 to 17, the column assembly 105 is composed of an upper column 42, which is the outer column, and a lower column 46, which is the inner column disposed on the front side (with respect to the vehicle body) of the upper column 42. A steering shaft (not shown) on which the steering wheel 101 shown in FIG. 1 is attached is rotatably supported on the rear side (with respect to the vehicle body) of the cylindrical upper column 42. The upper column 42 is guided by long grooves 121, 121 for tilt adjustment provided on side plates 21b, 21b of an upper bracket 21, which constitutes an upper vehicle-mounting bracket, to allow tilt adjustment.

The lower column 46 is internally fitted into the upper column 42 from the front with respect to the vehicle body (from right in FIG. 14) in such a way as to be able to move in a telescopic manner in the direction along its axis. A gear housing 47 of the electric assist mechanism 102 is attached to the front end (with respect to the vehicle body) of the lower column 46. A lower bracket 44, which constitutes a lower vehicle-mounting bracket, is attached on the upper (with respect to the vehicle body) portion of the gear housing 47. The lower bracket 44 is fixedly attached to the vehicle body (not shown) and supported in such a way that it can swing about a tilt center shaft 45 to allow tilt adjustment.

The upper column 42 has a slit 421 provided on its upper portion. The slit 421 penetrates the upper column 42 to its inner surface. The upper column 42 integrally has a member on which long grooves 422, 422 for telescopic adjustment having a longitudinal axis extending in parallel with the center axis of the upper column 42 are provided.

A fastening rod 51 passes through long grooves for tilt adjustment 121, 121 and the long grooves for telescopic adjustment 422, 422. An operation lever 52 is attached to an end of the fastening rod 51. The operation lever 52 is used to operate a movable cam and a fixed cam (not shown), which constitute a cam lock mechanism.

The upper column 42 is fastened (or clamped) on its sides by the side plates 21b, 21b of the upper bracket 21 by swinging the operation lever 52. With such fastening/loosening operation, the upper column 42 is clamped to/unclamped from the upper bracket 21. The adjustment of the tilt position of the upper column 42 is performed in the unclamped state. The fastening/loosening operation causes the diameter of the upper column 42 to decrease, thereby causing the inner circumferential surface of the upper column 42 to clamp/unclamp the outer circumferential surface of the lower column 46. The adjustment of the telescopic position of the upper column 42 is performed in the unclamped state.

The output shaft 107 projecting frontward (with respect to the vehicle body) from the gear housing 47 is coupled to a pinion engaging with a rack shaft of the steering gear assembly 103 via an intermediate shaft 106 to transmit rotational operation of the steering wheel 101 to the steering apparatus.

The upper bracket 21 is fixedly attached to the vehicle body (not shown) in such a manner that it can be detached upon a secondary collision. As shown in FIG. 17, the upper bracket 21 is composed of the aforementioned side plates 21b, 21b, an upper plate 21c provided above the side plates 21b, 21b in the vehicle body and bridging them integrally, and flanges 21a, 21a fixedly provided on the upper surface of the upper plate 21c to extend rightward and leftward. As shown in FIG. 15, the structure of attaching the upper bracket 21 to the vehicle body includes two cut grooves 23, 23 provided in pair on the right and left flanges 21a, 21a and capsules 24, 24 fitted to both edges of the cut grooves 23, 23. The attaching structure is symmetrical along the width direction of the vehicle body (vertical direction in FIG. 15) with respect to the center axis of the upper column 42. The capsules 24, 24 hold or sandwich the flanges 21a, 21a from above and below (with respect to the vehicle body).

The upper bracket 21 and the upper column 42 are made of an electrically conductive material such as a metal. The cut grooves 23, 23 open rearward (with respect to the vehicle body) on the flange 21a. The cut grooves 23, 23 are tapered with the groove width along the vertical direction in FIG. 15 or along the width direction of the vehicle body gradually increasing from the front to rear (with respect to the vehicle body). The capsules 24, 24 have tapered guide surfaces 241, 241 fitted to both edges of the tapered cut grooves 23, 23. This tapered structure allows easy detachment of the upper bracket 21 from the capsules 24, 24 upon a secondary collision.

The capsules 24, 24 fitted to the cut grooves 23, 23 are made of an electrically conductive material such as a metal or light alloy like aluminum or die-cast zinc alloy. The capsules 24, 24 are each attached to the flange 21a by four shear pins 24a. In addition, the capsules 24, 24 are fixed to the vehicle body by bolts (not shown) passing through bolt holes 24b provided in the capsules 24.

As the driver hits the steering wheel 101 upon a secondary collision to exert a strong impact force on it in the forward direction with respect to the vehicle body, the shear pins 24a shear, and the flange 21a of the upper bracket 21 is detached from the capsules 24 and makes collapsing movement or moves forward with respect to the vehicle body or rightward in FIGS. 14 and 15. Then, the upper column 42 makes collapsing movement or moves forward with respect to the vehicle body along the lower column 46 and collapses an energy absorption member to absorb the impact energy of the collision.

As shown in FIG. 14, an attaching portion 61a provided at the front end (with respect to the vehicle body) of the guide bracket 61 is fixed to the lower bracket 44 by a bolt 62. The guide bracket 61 is produced by bending a metal plate. At the lower end (with respect to the vehicle body) of the attaching portion 61a, there is provided a guide portion 61b that is bent in an L-shape and extends rearward with respect to the vehicle body. Ribs 61c, 61c are provided in the joining portion of the attaching portion 61a and the guide portion 61b to enhance the rigidity of the guide bracket 61.

The guide portion 61b is disposed above (in the vehicle body) the flange 21a of the upper bracket 21 and extends rearward with respect to the vehicle body along the lower column 46 in parallel to the lower column 46. The guide portion 61b has a length long enough to reach the vicinity of the rear end (with respect to the vehicle body) of the flange 21a. As shown in FIGS. 14 and 17, the guide portion 61b has, in the central portion with respect to the width direction of the vehicle body, a flat plate portion 61d constituting a flat portion lifted upward (with respect to the vehicle body). The flat plate portion 61d extends rearward (with respect to the vehicle body) from the lower end (with respect to the vehicle body) of the front (with respect to the vehicle body) attaching portion 61a. There is a predetermined gap between the flat plate portion 61d and the flange 21a of the upper bracket 21. The flat plate portion 61d has, in the central portion with respect to the width direction of the vehicle body, a guide groove 63 for guiding the collapsing movement of the upper bracket 21. The guide groove 63 extends in parallel to the center axis of the lower column 46.

The guide groove 63 is arranged to extend in parallel to the center axis of the lower column 46. As shown in FIG. 17, the flange 21a of the upper bracket 21 has a female screw 22 provided in the central portion with respect to the vehicle width direction. The guide pin 71 is inserted through the guide groove 63 from above (with respect to the vehicle body), and the male screw 711 at the end of the guide pin 71 is screwed into the female screw 22, thereby fixing the guide pin 71 to the flange 21a.

The guide pin 71 is integrally composed of the male screw 711, a cylindrical shaft portion 712 provided on top of the male screw 711 and having a diameter larger than the male screw 711, and a disk-like head portion 713 provided on top of the shaft portion 712 and having a diameter larger than the shaft portion 712. The head portion 713 of the guide pin 71 functions to press down the guide bracket 61 from above to restrict backlash of the upper bracket 21 with respect to the direction perpendicular to the direction of collapsing movement. The guide pin 71 is made of a metal such as iron. A spacer 72 made of a synthetic resin and having a hollow cylindrical shape is externally fitted on the outer circumference of the shaft portion 712. The spacer 72 is made of polyacetal also known by the abbreviated name POM, which has a small friction coefficient and good mechanical properties. The spacer 72 has a lower (with respect to the vehicle body) cylinder portion 721 and a disk-like flange portion 722 provided on top of the cylinder portion 721 and having a diameter larger than the cylinder portion 721. The upper surface 723 of the flange portion 722 of the spacer 72 has six projections 724 projecting upward with respect to the vehicle body (upward in FIG. 17), as with the above-described first embodiment.

As the male screw 711 of the guide pin 71 is screwed into the female screw 22, the lower end (with respect to the vehicle body) surface of the shaft portion 712 comes into abutment with the upper surface 211a of the flange 21a to stop. In consequence, the head portion 713 of the guide pin 71 presses the upper surface of the flange portion 722 of the spacer 72 by a predetermined pressing force. Therefore, the upper bracket 21 is attached to the guide bracket 61 without play, and the collapse load of the upper bracket 21 can be set to a predetermined load.

As shown in FIGS. 15 and 16, the guide groove 63 in the second embodiment has a small width groove portion 631 having a groove width W1 at its rear end (with respect to the vehicle body) and a large width groove portion 632 having a groove width W2 provided on the front side (with respect to the vehicle body) of the small width groove portion 631. The width W2 of the large width groove portion 632 is larger than the width W1 of the small width groove portion 631. The joining portion between the small width groove portion 631 and the large width groove portion 632 constitutes a slant groove portion 633, in which the groove width changes continuously from the small width groove portion 631 to the large width groove portion 632.

The groove width W1 of the small width groove portion 631 is dimensioned in such a way that the cylinder portion 721 of the spacer 72 is held therein with a small gap left between. The groove width W2 of the large width groove portion 632 is dimensioned to be smaller than the outer diameter D of the flange portion 722 of the spacer 72 shown in FIG. 4. Therefore, even when the upper bracket 21 makes collapsing movement or moves forward with respect to the vehicle body, the guide pin 71 and the spacer 72 will not be dislocated from the large width groove portion 632.

If the driver hits the steering wheel 101 upon a secondary collision to exert a strong impact force on it in the forward direction with respect to the vehicle body, the shear pins 24a shear, and the flange 21a of the upper bracket 21 is detached from the capsules 24 and makes collapsing movement or moves forward with respect to the vehicle body (or rightward in FIGS. 14 and 15). Then, the guide pin 71 makes collapsing movement or moves forward with respect to the vehicle body together with the spacer 72.

If the impact load F of the secondary collision acts in a direction inclined in the vehicle width direction with respect to the center axis of the upper column 42 as shown by hollow arrows F in FIGS. 15 and 16, the outer circumferential surface of the cylinder portion 721 of the spacer 72 is pressed to the small width groove portion 631. Since the slant groove portion 633 is provided on the front side (with respect to the vehicle body) of the small width groove portion 631 in proximity, the cylinder portion 721 moves smoothly along the slant groove portion 633 to come to the large width groove portion 632. In consequence, the load upon the start of the collapsing movement can be made small.

In the course of the collapsing movement, the large width groove portion 632 leaves a large gap between it and the outer circumferential surface of the cylinder portion 721 of the spacer 72. Therefore, an increase in the resistance during the collapsing movement can be prevented. Moreover, since the spacer 72 is made of a synthetic resin, there is no metallic contact between the guide groove 63 and the guide pin 71, leading to low friction coefficient between the guide groove 63 and the spacer 72. Therefore, the performance in absorbing the impact energy upon a secondary collision is stable, and the impact load absorption characteristics can be set accurately.

<First Modification of Second Embodiment>

Figure 18:
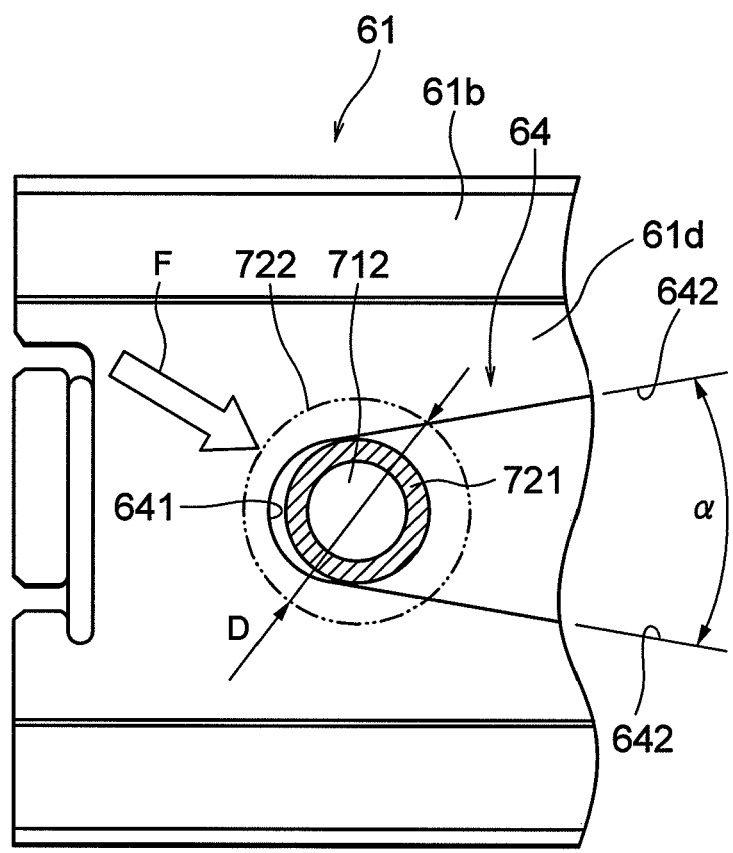
FIG. 18 is a view similar to FIG. 16, showing a guide groove in a first modification of the second embodiment of the present invention.

A first modification of the second embodiment of the present invention will be described. FIG. 18 is a view similar to FIG. 16 showing the guide groove in the first modification of the second embodiment of the present invention. In the following description, only the portions that are different from those in the above-described second embodiment will be described, and redundant descriptions will not be made. The same parts will be denoted by the same reference numerals in the description. The first modification pertains to a modification of the guide groove in the second embodiment. In the modification, the guide groove is shaped in such a way that the groove width increases gradually from its rear to front with respect to the vehicle body.

As shown in FIG. 18, the guide groove 64 in the first modification is shaped in such a way that the groove width increases gradually from its rear to front with respect to the vehicle body at an angle α. Specifically, the guide groove 64 has a slant groove portion 642 that extends frontward with respect to the vehicle body from an arc-shaped closed end portion 641 at the rear end with respect to the vehicle body and is in contact with the outer circumference of the cylinder portion 721 of the spacer 72. The width of the widest portion of the guide groove 64 is smaller than the outer diameter D of the flange portion 722 of the spacer 72. Therefore, even when the upper bracket 21 makes collapsing movement or moves forward with respect to the vehicle body, the guide pin 71 and the spacer 72 will not be dislocated from the guide groove 64.

When the driver hits the steering wheel 101 upon a secondary collision, the flange 21a of the upper bracket 21 makes collapsing movement or moves forward with respect to the vehicle body (or rightward in FIG. 18). Then, the guide pin 71 makes collapsing movement or moves forward with respect to the vehicle body together with the spacer 72.

If the impact load F of the secondary collision acts in a direction inclined in the vehicle width direction with respect to the center axis of the upper column 42 as shown by hollow arrow F in FIG. 18, the outer circumferential surface of the cylinder portion 721 of the spacer 72 is pressed to the slant groove portion 642 of the guide groove 64. Since the slant groove portion 642 is slanted at an angle α, the cylinder portion 721 smoothly makes collapsing movement or moves along the slant groove portion 642. In consequence, the load upon the start of the collapsing movement can be made small. In the course of the collapsing movement, the slant groove portion 642 leaves a large gap between it and the outer circumferential surface of the cylinder portion 721 of the spacer 72. Therefore, an increase in the resistance during the collapsing movement can be prevented. Therefore, the performance in absorbing the impact energy upon a secondary collision is stable, and the impact load absorption characteristics can be set accurately.

<Second Modification of Second Embodiment>

Figure 19:
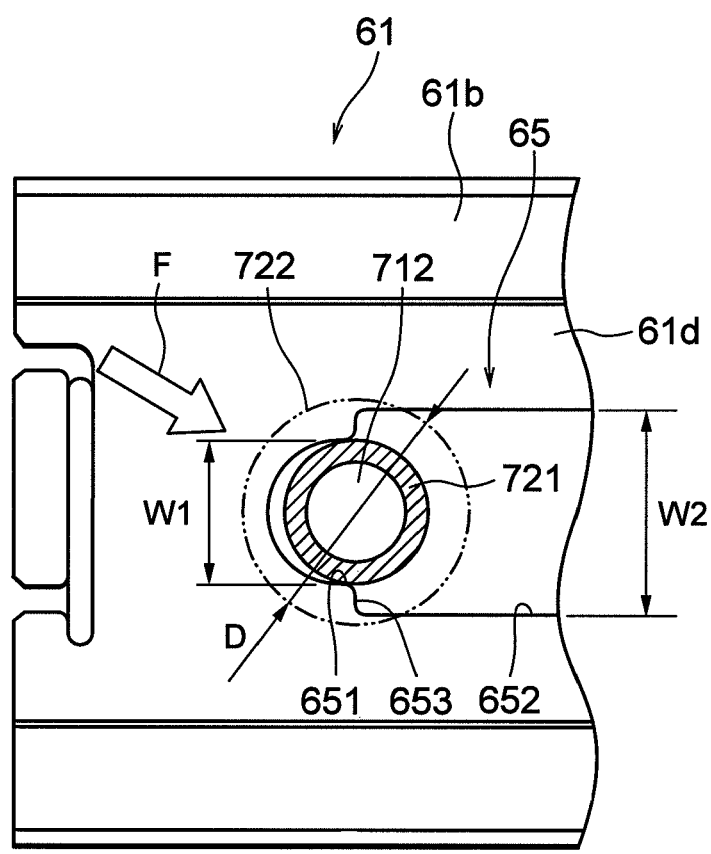
FIG. 19 is a view similar to FIG. 16, showing a guide groove in a second modification of the second embodiment of the present invention.

A second modification of the second embodiment of the present invention will be described. FIG. 19 is a view similar to FIG. 16 showing the guide groove in the second modification of the second embodiment of the present invention. In the following description, only the portions that are different from those in the above-described second embodiment will be described, and redundant descriptions will not be made. The same parts will be denoted by the same reference numerals in the description. The second modification pertains to a modification of the guide groove in the second embodiment. In the modification, the shape of the small width groove portion and the shape of the slant groove portion are modified.

As shown in FIG. 19, the guide groove 65 in the second modification has a small width groove portion 651 having a width W1 at its rear end (with respect to the vehicle body) and a large width groove portion 652 having a width W2 provided on the front side (with respect to the vehicle body) of the small width groove portion 651. While the small width groove portion 631 in the second embodiment extends to the vicinity of the front end (with respect to the vehicle body) of the cylinder portion 721 of the spacer 72, the small width groove portion 651 in the second modification of the second embodiment extends only to a position a little beyond the center of the cylinder portion 721 of the spacer 72.

The width W2 of the large width groove portion 652 is larger than the width W1 of the small width groove portion 651. The joining portion between the small width groove portion 651 and the large width groove portion 652 constitutes a step groove portion 653, which extends from the small width groove portion 651 outwardly with respect to the vehicle width direction at a right angle to provide an abrupt change in the groove width from the small width groove portion 651 to the large width groove portion 652.

The groove width W1 of the small width groove portion 651 is dimensioned in such a way that the cylinder portion 721 of the spacer 72 is held therein with a small gap left between. The groove width W2 of the large width groove portion 652 is dimensioned to be smaller than the outer diameter D of the flange portion 722 of the spacer 72 shown in FIG. 19. Therefore, even when the upper bracket 21 makes collapsing movement or moves forward with respect to the vehicle body, the guide pin 71 and the spacer 72 will not be dislocated from the large width groove portion 652.

If the driver hits the steering wheel 101 upon a secondary collision, the flange 21a of the upper bracket 21 makes collapsing movement or moves forward with respect to the vehicle body (or rightward in FIG. 19). Then, the guide pin 71 makes collapsing movement or moves forward with respect to the vehicle body together with the spacer 72.

If the impact load F of the secondary collision acts in a direction inclined in the vehicle width direction with respect to the center axis of the upper column 42 as shown by hollow arrows F in FIG. 19, the outer circumferential surface of the cylinder portion 721 of the spacer 72 is pressed to the small width groove portion 651. Since the step groove portion 653 is provided on the front side (with respect to the vehicle body) of the small width groove portion 651 in proximity, the cylinder portion 721 smoothly moves along the step groove portion 653 and comes to the large width groove portion 652. In consequence, the load upon the start of the collapsing movement can be made small. In the course of the collapsing movement, the large width groove portion 652 leaves a large gap between it and the outer circumferential surface of the cylinder portion 721 of the spacer 72. Therefore, an increase in the resistance during the collapsing movement can be prevented. Therefore, the performance in absorbing the impact energy upon a secondary collision is stable, and the impact load absorption characteristics can be set accurately.

<Third Modification of Second Embodiment>

Figure 20:
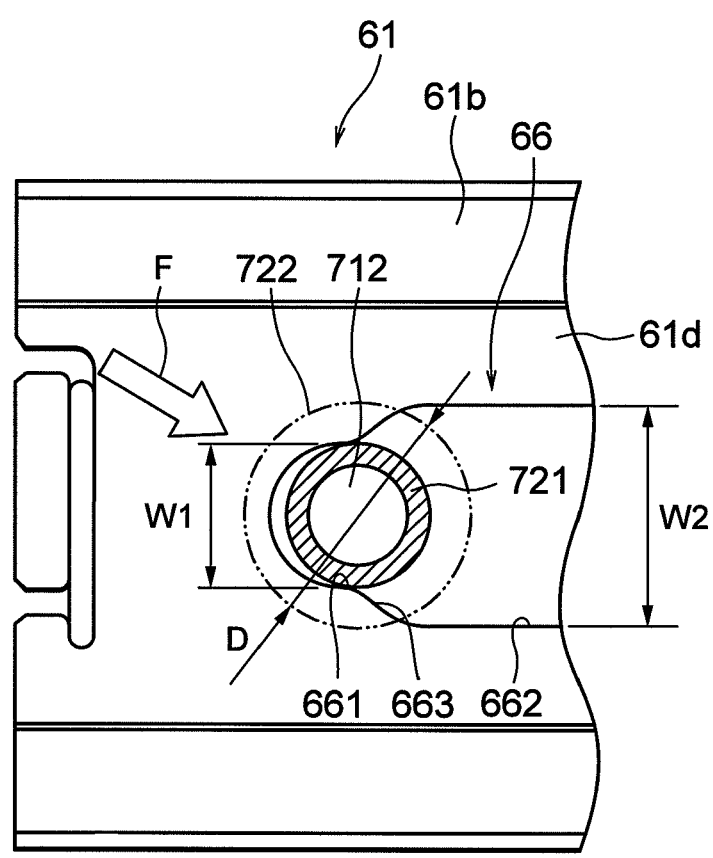
FIG. 20 is a view similar to FIG. 16, showing a guide groove in a third modification of the second embodiment of the present invention.

A third modification of the second embodiment of the present invention will be described. FIG. 20 is a view similar to FIG. 16 showing the guide groove in the third modification of the second embodiment of the present invention. In the following description, only the portions that are different from those in the above-described second embodiment will be described, and redundant descriptions will not be made. The same parts will be denoted by the same reference numerals in the description. The third modification pertains to a modification of the guide groove in the second modification of the second embodiment. In the modification, the step groove portion is replaced by a slant groove portion.

As shown in FIG. 20, the guide groove 66 in the third modification has a small width groove portion 661 having a width W1 at its rear end (with respect to the vehicle body) and a large width groove portion 662 having a width W2 provided on the front side (with respect to the vehicle body) of the small width groove portion 661. The holding groove 661 in the third modification extends only to a position a little beyond the center of the cylinder portion 721 of the spacer 72, as with that in the second modification of the second embodiment.

The width W2 of the large width groove portion 662 is larger than the width W1 of the small width groove portion 661. The joining portion between the small width groove portion 661 and the large width groove portion 662 constitutes a slant groove portion 663, which extends from the small width groove portion 661 to the large width groove portion 662 with the groove width continuously changing.

The groove width W1 of the small width groove portion 661 is dimensioned in such a way that the cylinder portion 721 of the spacer 72 is held therein with a small gap left between. The groove width W2 of the large width groove portion 662 is dimensioned to be smaller than the outer diameter D of the flange portion 722 of the spacer 72 shown in FIG. 20. Therefore, even when the upper bracket 21 makes collapsing movement or moves forward with respect to the vehicle body, the guide pin 71 and the spacer 72 will not be dislocated from the large width groove portion 662.

If the driver hits the steering wheel 101 upon a secondary collision, the flange 21a of the upper bracket 21 makes collapsing movement or moves forward with respect to the vehicle body (or rightward in FIG. 20). Then, the guide pin 71 makes collapsing movement or moves forward with respect to the vehicle body together with the spacer 72.

If the impact load F of the secondary collision acts in a direction inclined in the vehicle width direction with respect to the center axis of the upper column 42 as shown by hollow arrows F in FIG. 20, the outer circumferential surface of the cylinder portion 721 of the spacer 72 is pressed to the small width groove portion 661. Since the slant groove portion 663 is provided on the front side (with respect to the vehicle body) of the small width groove portion 661 in proximity, the cylinder portion 721 smoothly moves along the slant groove portion 663 and comes to the large width groove portion 662. In consequence, the load upon the start of the collapsing movement can be made small. In the course of the collapsing movement, the large width groove portion 662 leaves a large gap between it and the outer circumferential surface of the cylinder portion 721 of the spacer 72. Therefore, an increase in the resistance during the collapsing movement can be prevented. Therefore, the performance in absorbing the impact energy upon a secondary collision is stable, and the impact load absorption characteristics can be set accurately.

<Fourth Modification of Second Embodiment>

Figure 21:
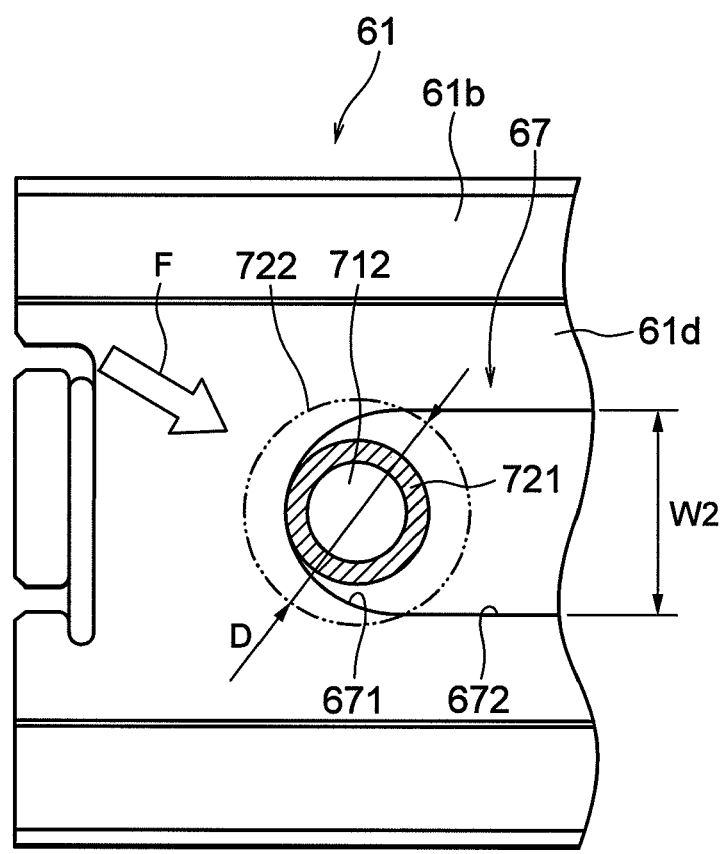
FIG. 21 is a view similar to FIG. 16, showing a guide groove in a fourth modification of the second embodiment.

A fourth modification of the second embodiment of the present invention will be described. FIG. 21 is a view similar to FIG. 16 showing the guide groove in the fourth modification of the second embodiment of the present invention. In the following description, only the portions that are different from those in the above-described second embodiment will be described, and redundant descriptions will not be made. The same parts will be denoted by the same reference numerals in the description. The fourth modification pertains to a modification of the guide groove in the second embodiment. In the modification, the guide groove is shaped in such a way that the groove width increases sharply from its rear end to front with respect to the vehicle body.

As shown in FIG. 21, the guide groove 67 in the fourth modification is shaped in such a way that the groove width increases sharply from its rear end to front with respect to the vehicle body. Specifically, the groove width W2 of the large width groove portion 672 of the guide groove 67 is larger than the diameter of the cylinder portion 721 of the spacer 72, and the arc-shaped closed end portion 671 at its rear end has a diameter equal to the groove width W2 of the large width groove portion 672. The arc-shaped closed end portion 671 is in contact with the rear side (with respect to the vehicle body) of the outer circumference of the cylinder portion 721 of the spacer 72. The groove width W2 of the large width groove portion 672 is smaller than the outer diameter D of the flange portion 722 of the spacer 72 shown in FIG. 21. Therefore, even when the upper bracket 21 makes collapsing movement or moves forward with respect to the vehicle body, the guide pin 71 and the spacer 72 will not be dislocated from the guide groove 67.

When the driver hits the steering wheel 101 upon a secondary collision, the flange 21a of the upper bracket 21 makes collapsing movement or moves forward with respect to the vehicle body (or rightward in FIG. 21). Then, the guide pin 71 makes collapsing movement or moves forward with respect to the vehicle body together with the spacer 72.

If the impact load F of the secondary collision acts in a direction inclined in the vehicle width direction with respect to the center axis of the upper column 42 as shown by hollow arrow F in FIG. 21, the outer circumferential surface of the cylinder portion 721 of the spacer 72 is pressed to the arc-shaped closed end portion 671 of the guide groove 67. Since the arc-shaped closed end portion 671 has a moderate curve, the cylinder portion 721 smoothly makes collapsing movement or moves along the arc-shaped closed end portion 671. In consequence, the load upon the start of the collapsing movement can be made small. In the course of the collapsing movement, the large width groove portion 672 leaves a large gap between it and the outer circumferential surface of the cylinder portion 721 of the spacer 72. Therefore, an increase in the resistance during the collapsing movement can be prevented. Therefore, the performance in absorbing the impact energy upon a secondary collision is stable, and the impact load absorption characteristics can be set accurately.

<Fifth Modification of Second Embodiment>

Figure 22:
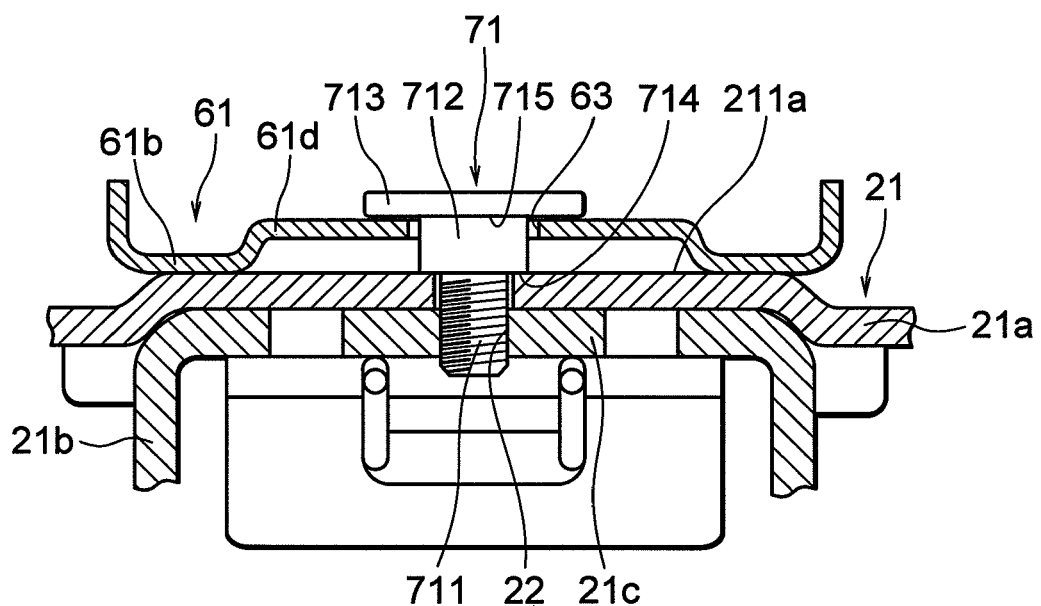
FIG. 22 is a view similar to FIG. 17, showing the portion in which a guide pin and a guide groove are in contact in a fifth modification of the second embodiment of the present invention.

A fifth modification of the second embodiment of the present invention will be described. FIG. 22 is a view similar to FIG. 17 showing the portion in which the guide pin and the guide groove are in contact in the fifth modification of the second embodiment of the present invention. In the following description, only the portions that are different from those in the above-described second embodiment will be described, and redundant descriptions will not be made. The same parts will be denoted by the same reference numerals in the description. The fifth modification is a modification of the second embodiment. In the modification, the resin spacer 72 is eliminated.

As shown in FIG. 22, the flange 21a of the upper bracket 21 has a female screw 22 provided in the central portion with respect to the vehicle width direction. The guide pin 71 is inserted through the guide groove 63 from above (with respect to the vehicle body), and the male screw 711 at the end of the guide pin 71 is screwed into the female screw 22, thereby fixing the guide pin 71 to the flange 21a.

The guide pin 71 is integrally composed of the male screw 711, a cylindrical shaft portion 712 provided on top of the male screw 711 and having a diameter larger than the male screw 711, and a disk-like head portion 713 provided on top of the shaft portion 712 and having a diameter larger than the shaft portion 712. The guide pin 71 is made of a metal such as iron. In the fifth modification, the spacer 72 made of a synthetic resin externally fitted on the outer circumferential surface of the shaft portion 72 is eliminated.

As the male screw 711 of the guide pin 71 is screwed into the female screw 22, the lower end (with respect to the vehicle body) surface of the shaft portion 712 comes into abutment with the upper surface 211a of the flange 21a to stop. In consequence, the head portion 713 of the guide pin 71 presses the upper surface of the flat plate portion 61d of the guide bracket 61 by a predetermined pressing force. Therefore, the upper bracket 21 is attached to the guide bracket 61 without play, and the collapse load of the upper bracket 21 can be set to a predetermined load.

Even without the synthetic resin spacer 72, providing the guide groove 63, 64, 65, 66, 67 described in the second embodiment or the first to fourth modifications will provide stable performance in absorbing the impact energy upon a secondary collision and enable accurate setting of the impact load absorption characteristics. As another modification, the guide pin 71 may be made of a synthetic resin, and the spacer 72 made of a synthetic resin may be eliminated.

The distance between the lower surface 715 of the head portion 713 of the guide pin 71 and the shoulder surface 714 is designed based on the length of the gap between the flat plate portion 61d of the guide bracket 61 and the flange 21a of the upper bracket 21 and the thickness of the flat plate portion 61d in such a way that when the guide pin 71 is tightened until the shoulder surface 714 comes into abutment with the upper surface 211a of the flange 21a, a predetermined pressing force is exerted on the flat plate portion 61d and the detaching force upon detachment of the upper bracket 21 and the upper column 42 in the frontward direction with respect to the vehicle body by the impact force of a secondary collision is set to a desired value.

<Sixth Modification of Second Embodiment>

Figure 23:
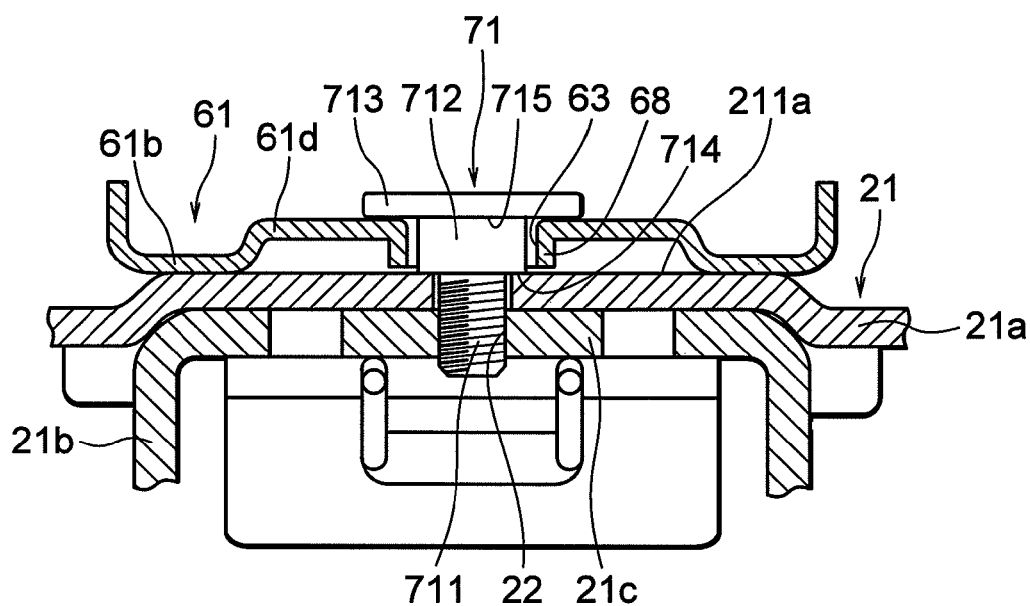
FIG. 23 is a view similar to FIG. 17, showing the portion in which a guide pin and a guide groove are in contact in a sixth modification of the second embodiment of the present invention.

A sixth modification of the second embodiment of the present invention will be described. FIG. 23 is a view similar to FIG. 17 showing the portion in which the guide pin and the guide groove are in contact in the sixth modification of the second embodiment of the present invention. In the following description, only the portions that are different from those in the above-described second embodiment will be described, and redundant descriptions will not be made. The same parts will be denoted by the same reference numerals in the description. The sixth modification is a modification of the fifth modification of the second embodiment. In the modification, the resin spacer 72 is eliminated, and the circumferential edge of the guide groove is bent to enlarge the contact area between the shaft portion 712 of the guide pin 71 and the guide groove.

As shown in FIG. 23, the guide portion 61b of the guide bracket 61 has, in its central portion with respect to the width direction of the vehicle body, a guide groove 63 for guiding the collapsing movement of the upper bracket 21. The circumferential edge of the guide groove 63 is bent by burring to form a rising portion 68 extending downward with respect to the vehicle body, thereby enlarging the contact area with the shaft portion 712 of the guide pin 71

The flange 21a of the upper bracket 21 has a female screw 22 provided in the central portion with respect to the vehicle width direction. The guide pin 71 is inserted through the guide groove 63 from above (with respect to the vehicle body), and the male screw 711 at the end of the guide pin 71 is screwed into the female screw 22, thereby fixing the guide pin 71 to the flange 21a.

The guide pin 71 is integrally composed of the male screw 711, the cylindrical shaft portion 712 provided on top of the male screw 711 and having a diameter larger than the male screw 711, and a disk-like head portion 713 provided on top of the shaft portion 712 and having a diameter larger than the shaft portion 712. The guide pin 71 is made of a metal such as iron. In the sixth modification, the spacer 72 made of a synthetic resin externally fitted on the outer circumferential surface of the shaft portion 712 is eliminated.

As the male screw 711 of the guide pin 71 is screwed into the female screw 22, the lower end (with respect to the vehicle body) surface of the shaft portion 712 comes into abutment with the upper surface 211a of the flange 21a to stop. In consequence, the head portion 713 of the guide pin 71 presses the upper surface of the flat plate portion 61d of the guide bracket 61 by a predetermined pressing force. Therefore, the upper bracket 21 is attached to the guide bracket 61 without play, and the collapse load of the upper bracket 21 can be set to a predetermined load.

Since the contact area between the guide groove 63 and the shaft portion 712 of the guide pin 71 is enlarged by burring, the contact pressure between the guide groove 63 and the cylinder portion 721 is decreased. Moreover, the surface in contact with the shaft portion 712 is not a press-cut surface, the surface in contact with the shaft portion 712 is smooth. Therefore, even without the synthetic resin spacer 72, providing the guide groove 63, 64, 65, 66, 67 described in the second embodiment or the first to fourth modifications will provide stable performance in absorbing the impact energy upon a secondary collision and enable accurate setting of the impact load absorption characteristics.

In the above-described structure in which the tapered cut groove 23 and the tapered guide surface 241 facilitate the detachment of the upper bracket 21 from the capsule 24, the detachment of the upper bracket 21 from the capsule 24 creates a gap between the cut groove 23 and the guide surface 241 with respect to the vehicle width direction. Then, the upper bracket 21 will easily incline in the vehicle width direction with respect to the center axis of the upper column 42. Therefore, the use of the guide groove and the guide pin according to the second embodiment and the first to sixth modifications thereof is effective.

While in the second embodiment and the first to sixth modifications thereof, there have been described cases in which the present invention is applied to a tilt-telescopic type steering apparatus in which the tilt position and the telescopic position of the column are both adjusted, the present invention may be applied to a tilt type steering apparatus, a telescopic type steering apparatus, and a steering apparatus that allows adjustment of neither the tilt position nor telescopic position.

In the second embodiment of the present invention and its first to sixth modifications, the guide groove is provided on the guide bracket having a front end (with respect to the vehicle body) fixed to the lower bracket and extending rearward (with respect to the vehicle body) along the lower column. The guide groove is to guide the shaft portion of the guide pin to the front end (with respect to the vehicle body) of the collapsing movement. The groove width of the guide groove is larger at its front end (with respect to the vehicle body) than at its rear end (with respect to the vehicle body).

In consequence, if the impact load of a secondary collision acts in a direction inclined in the vehicle width direction with respect to the center axis of the upper column, the outer circumferential surface of the guide pin is pressed to the guide groove. Since the guide pin moves to the front (with respect to the vehicle body) portion of the guide groove having a large groove width, the load upon the start of the collapsing movement can be made small. Moreover, in the course of the collapsing movement, the guide groove leaves a large gap between it and the outer circumferential surface of the guide pin. In consequence, an increase in the resistance during the collapsing movement can be prevented. Therefore, the performance in absorbing the impact energy upon a secondary collision is stable, and the impact load absorption characteristics can be set accurately.

The invention claimed is:

1. A steering apparatus comprising:
a lower column that can be fixed to a vehicle body by its front side with respect to the vehicle body;
an upper column that is fitted to said lower column in such a way as to be able to make collapsing movement or move frontward with respect to the vehicle body and rotatably supports a steering shaft on which a steering wheel is attached;
an upper bracket that can be attached to the vehicle body in such a way that it can be detached forward with respect to the vehicle body together with said upper column by an impact force upon a secondary collision;
a guide bracket that is fixed to said lower column by its front side with respect to the vehicle body, extends rearward with respect to the vehicle body along said lower column, and has a guide groove that guides the collapsing movement of said upper column upon a secondary collision; and
a guide pin that is fixed to said upper bracket and can move with the upper bracket with the outer circumferential surface of its shaft portion being guided by said guide groove,
wherein said guide bracket has a flat plate portion that is not in contact with said upper bracket, said flat plate portion being provided with said guide groove,
said guide pin has a head portion provided on top of the shaft portion of the guide pin and having a diameter larger than the shaft portion, and
the steering apparatus comprises a gap setting portion that is in abutment with an upper surface of said upper bracket when said guide pin is fixed to said upper bracket to set the length of a gap between a lower surface of said head portion and an upper surface of the upper bracket to a predetermined value.

2. A steering apparatus according to claim 1, comprising a spacer made of a synthetic resin that is externally fitted on an outer circumferential surface of the shaft portion of the guide pin and can make collapsing movement or move with its outer circumferential surface being in contact with said guide groove, wherein the outer circumferential surface of said spacer is provided on a cylinder portion that can make collapsing movement or move while being in contact with said guide groove.

3. A steering apparatus according to claim 2, wherein the outer circumferential surface of said spacer is provided with two flat portions parallel to each other that can make collapsing movement or move while being in contact with said guide groove.

4. A steering apparatus according to claim 3, wherein the groove width of said guide groove at its front side with respect to the vehicle body is larger than the groove width of the guide groove at its rear end with respect to the vehicle body.

5. A steering apparatus according to claim 2, comprising a flange portion provided at the top of said spacer and having a diameter larger than the outer circumference of the spacer.

6. A steering apparatus according to claim 5, wherein the flange portion of said spacer has a disk-like shape.

7. A steering apparatus according to claim 6, wherein the groove width of said guide groove at its front side with respect to the vehicle body is larger than the groove width of the guide groove at its rear end with respect to the vehicle body.

8. A steering apparatus according to claim 5, wherein the flange portion of said spacer has a rectangular shape.

9. A steering apparatus according to claim 8, wherein the groove width of said guide groove at its front side with respect to the vehicle body is larger than the groove width of the guide groove at its rear end with respect to the vehicle body.

10. A steering apparatus according to claim 5, comprising a projection that is provided on an upper surface of said flange portion in such a way as to project upward with respect to the vehicle body and can be plastically deformed when pressed by a lower surface of said head portion.

11. A steering apparatus according to claim 10, wherein the cross sectional area of said projection of said flange portion on a plane perpendicular to a center axis of said spacer decreases upward with respect to the vehicle body.

12. A steering apparatus according to claim 11, wherein the groove width of said guide groove at its front side with respect to the vehicle body is larger than the groove width of the guide groove at its rear end with respect to the vehicle body.

13. A steering apparatus according to claim 10, wherein the groove width of said guide groove at its front side with respect to the vehicle body is larger than the groove width of the guide groove at its rear end with respect to the vehicle body.

14. A steering apparatus according to claim 5, wherein the groove width of said guide groove at its front side with respect to the vehicle body is larger than the groove width of the guide groove at its rear end with respect to the vehicle body.

15. A steering apparatus according to claim 2, wherein said gap setting portion is a shoulder surface that is integral with the shaft portion of said guide pin, and the distance between the lower surface of said head portion and said shoulder surface along the center axis of said guide pin is larger than the length of said spacer along the center axis.

16. A steering apparatus according to claim 2, wherein said gap setting portion comprises a hollow cylindrical sleeve that is externally fitted on an outer circumferential surface of the shaft portion of said guide pin and has an outer circumferential surface on which said spacer is externally fitted, and the length of said sleeve along its center axis is larger than the length of said spacer along its center axis.

17. A steering apparatus according to claim 2, wherein the groove width of said guide groove at its front side, with respect to the vehicle body is larger than the groove width of the guide groove at its rear end with respect to the vehicle body.

18. A steering apparatus according to claim 1, wherein the groove width of said guide groove at its front side with respect to the vehicle body is larger than the groove width of the guide groove at its rear end with respect to the vehicle body.

19. A steering apparatus according to claim 18, a circumferential edge of said guide groove of said guide bracket is raised by burring.

* * * * *